(12) United States Patent
Passova et al.

(10) Patent No.: US 10,438,166 B2
(45) Date of Patent: Oct. 8, 2019

(54) SYSTEMS AND METHODS FOR BUSINESS PROCESS MODELLING

(75) Inventors: Sofia Passova, Richmond Hill (CA); Alexander Ladizginsky, Toronto (CA); Stanislav Passov, Richmond Hill (CA)

(73) Assignee: STEREOLOGIC INC., Richmond Hill (CA)

( * ) Notice: Subject to any disclaimer, the term of this patent is extended or adjusted under 35 U.S.C. 154(b) by 286 days.

(21) Appl. No.: 12/632,472

(22) Filed: Dec. 7, 2009

(65) Prior Publication Data

US 2010/0174583 A1 Jul. 8, 2010

Related U.S. Application Data

(60) Provisional application No. 61/120,096, filed on Dec. 5, 2008, provisional application No. 61/168,246, filed on Apr. 10, 2009.

(51) Int. Cl.
*G06Q 10/06* (2012.01)
*G06Q 10/10* (2012.01)

(52) U.S. Cl.
CPC ........... *G06Q 10/10* (2013.01); *G06Q 10/063* (2013.01); *G06Q 10/067* (2013.01); *G06Q 10/0633* (2013.01)

(58) Field of Classification Search
CPC .................. G06Q 10/067; G06Q 10/063
USPC ........................................... 705/7.27
See application file for complete search history.

(56) References Cited

U.S. PATENT DOCUMENTS

| | | | |
|---|---|---|---|
| 2006/0184410 A1* | 8/2006 | Ramamurthy et al. | 705/8 |
| 2007/0226022 A1* | 9/2007 | Das et al. | 705/7 |
| 2008/0005693 A1* | 1/2008 | Oliver | G06F 9/4443 715/781 |

* cited by examiner

*Primary Examiner* — Nadja N Chong Cruz
(74) *Attorney, Agent, or Firm* — Gowling WLG (Canada) LLP; Neil W. Henderson

(57) ABSTRACT

A system and method for automatically or semi-automatically analyzing business processes including elements for or processes for: monitoring business activities as conducted by a user of a target software application by monitoring the computer screens viewed by the user and user-system interaction; using pattern matching to determine the semantic elements of each computer screen and action; using screen element identity relationships to compare screens and develop process flows based on a sequence of the computer screens and the user-system interaction; using process flow end-point comparisons to synthesize business process fragments from the process flows; and combining business process fragments to create a business process model.

10 Claims, 20 Drawing Sheets

SYSTEMS AND METHODS FOR BUSINESS PROCESS MODELLING

REFERENCE TO RELATED APPLICATIONS

This application claims the benefit of U.S. Provisional Patent Application No. 61/120,096, filed Dec. 5, 2008 and U.S. Provisional Patent Application No. 61/168,246, filed Apr. 10, 2009, both of which are hereby incorporated by reference herein.

FIELD

The present application relates generally to systems and methods for business process modeling, including discovery of business process models and editing, simulating, collaborating and integrating business process models. In particular, the systems and methods relate to developing business process models based on existing business processes conducted using legacy software.

BACKGROUND

Modern business can be very complex. To stay ahead and profitable in such a complex environment, a business needs to be able to change rapidly and to support innovations, expansions, acquisitions, and new partnering. Therefore, a deep understanding of the internal business structure, including business processes, rules, data and methods of the business's transformations are critical. The need for this understanding explains the significant growth of new markets, such as:

Business Process Management (BPM) which may be defined as modeling, simulation and improvement of business processes;

Business Process Transformation (BPT), the planning and implementation of new business processes and the enabling of models and technologies that represent significant change to existing business models;

Service Oriented Modeling and Architecture (SOA) which is the identification of business processes, services and their specifications;

Business Process Outsourcing (BPO), defined as the transmission of processes along with the associated operational activities and responsibilities; and Application Security Frequently, companies do not have a clear picture of their business processes. These processes are hidden in volumes of documentation, legacy systems and individuals' minds.

Currently, a significant amount of dollars and resources are spent to understand the state of companies' business to develop further business process (BP) understanding and improvements. The work is often performed manually and may have an ad-hoc nature. The results of this type of effort may not be explicit enough and may also be unreliable due to the possibility of human error.

For the creation of business process definitions practitioners often rely on Microsoft® Visio® and other like tools that were not developed for this purpose. In February 2006, Object Management Group proposed a standard business process modeling notation (BPMN) for definitions of business processes. This new standard was a catalyst for multiple BPMN vendors and tools oriented on the definition and analysis of BP in terms of BPMN and including specialized editors. However, businesses have not widely adapted these tools and many prove difficult and unintuitive.

Today the business process transformation is mainly performed manually using multiple heterogeneous tools. Most of these tools are IT-centric. As a result, business process transformation is often complex, slow and inconsistent. There is a risk of losing essential business knowledge and destroying relations between key business artifacts.

Introducing new lines of business, new partner solutions, outsourcing, and B2B are difficult without integration of multiple business processes. Today, this integration can be time-consuming work that requires significant manual effort.

Implementation of business processes requires their integration with IT solutions. For SOA, as an example, a formal transformation from BPMN to business process execution language (BPEL) is needed. Similarly, an SAP™ implementation requires very clear definition of the business processes and business rules in order to map them to SAP modules and configuration parameters. The integration between business processes and IT implementation modules are often inefficient.

Globalized and distributed business process development require highly evolved collaboration environment. The BPM tools currently available on the market may support collaboration via repositories built on Client Server and Web platforms. This mechanism may create a complex protocol for accessing and updating the information.

While IT stakeholders are comfortable with using repositories, the business users may find them too complex and continue to use less disciplined tools, such as Microsoft® Outlook® and SharePoint®. This may slow down the collaboration process.

There is a need for systems and methods for business process modeling that overcome at least some of the issues present in conventional systems.

SUMMARY

In one aspect described herein, there is provided a system and method for automatically or semi-automatically analyzing business processes comprising: monitoring the business activities as conducted by a user by monitoring the computer screens viewed by the user and user-system interaction; using pattern matching to determine the semantic elements of each computer screen; using screen element identity relationships to compare screens and develop process flows based on a sequence of the computer screens; using process flow end-point comparisons to synthesize business process fragments from the process flows; and combining business process fragments to create a business process model.

In some cases, the business process model can also be automatically translated into a business process modeling notation for further manipulation.

In some cases, the systems and methods may make use of an intelligent agent that determines when additional information is needed from a user, for example a business user or business analyst or the like, and may request the needed information from the user. The intelligent agent may also provide one or more possible hypotheses to the user.

In some cases, the systems and methods may include: recording the computer screens viewed and the user-system interaction and creating a preliminary business process model based on the computer screens viewed and displaying the business process model as a conceptual visual notation on a display. In a further aspect, the conceptual visual notation may consist of correlated models including visual flows of a plurality of activities; data corresponding to a process flow; user-interaction storyboard; process history and process performance metrics and measurements.

In a further case, the system may include a self-learning capability that allows it to learn and improve the recognition process based on a user's activities.

According to a further aspect, there is provided a system for modeling business processes comprising: a discovery module for receiving and automatically analyzing information about a business process; a modeler module for automatically modeling the business process based on the information received and analyzed by the discovery module; and a transformation module for transforming the business model to a business modeling notation for storage and modification purposes.

In a particular case of this aspect, the business process may be embodied by an existing target software application and the discovery module may comprise: a user monitoring component for monitoring a sequence of activities as conducted by a user of the target software application by monitoring the computer screens viewed by the user and user interactions at each computer screen; and a communications component for automatic communication with the user to confirm information about the computer screens viewed by the user and user interactions.

In this case, the modeler module may comprise: an automatic pattern matching module that uses pattern matching to determine key semantic (logical) elements of each computer screen; an automatic flow analysis system that uses logical screen identity and flow identity rules to automatically analyze, define and classify business process flows into a set of business process flows; and a generation module that creates a preliminary business process model based on the set of business process flows.

In some cases, the discovery module may further comprises: a recording component for recording the computer screens viewed and user-system interaction for subsequent review. In these cases, the recording component may record the computer screens viewed and user-system interaction in association with the business process flows.

According to yet a further aspect, there is provided a method for modeling business processes comprising: monitoring a sequence of activities as conducted by a user of a target software application by monitoring the computer screens viewed by the user and user-system interactions; using automatic pattern matching to determine key semantic (logical) elements of each computer screen; using logical screen identity and flow identity rules to automatically analyze, define and classify business process flows; using intersection points of process flows to define business process fragments from the process flows, and combining business process fragments to create a business process model.

According to yet a further aspect, there is provided a computer aided system for modeling business processes comprising: a monitoring module for monitoring a sequence of activities as conducted by a user of a target software application by monitoring the computer screens viewed by the user and user-system interactions; a recording module for recording the computer screens viewed and user-system interaction; a generator module for automatically creating a preliminary business process model based on the computer screens viewed and user-system interaction and for displaying the business process model as a flow chart on a display; and an editor module for allowing a business process analyst to view the user screens and recorded screens and user inputs, and system data and pull information from screens and user inputs, and system data and place it into the business process model and modify the business process model.

The embodiments of the systems and methods described herein are intended to provide simpler, more flexible and more user-friendly business process modeling tools that can function together well with formal business modeling notations and methodologies.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached Figures, wherein.

DETAILED DESCRIPTION

It will be understood that the examples given are for illustration purposes only and that any specific limitations are indicated only for ease of understanding of the examples and may be modified as understood by one of skill in the art.

It will be understood that the systems and methods herein may be embodied in software or hardware or some combination of the two. Further, the software may comprise computer program instructions provided on a physical medium that when executed by a processor of a computing device cause the device to perform the method indicated by the software.

This document describes a system and method for business process modeling that is intended to be an easy and flexible solution that provides computer assisted, semi-automated discovery of business processes from existing applications. It will be understood that the various functions and capabilities of each embodiment are not necessarily required elements and there may be possibilities to use various functions together or separately in other embodiments.

The following sections discuss the challenges involved in business process discovery, outline the framework of a business process modeling system and method, provide further detail of a computer assisted embodiment (sometimes referred to as Discovery 1) and then provide further detail of another embodiment (sometimes referred to as Discovery 2). The embodiments together provide an overview of the systems and methods. This document also includes information on a business process editor that can be used within the systems and methods and an example of an application of the systems and methods.

Figure 1:
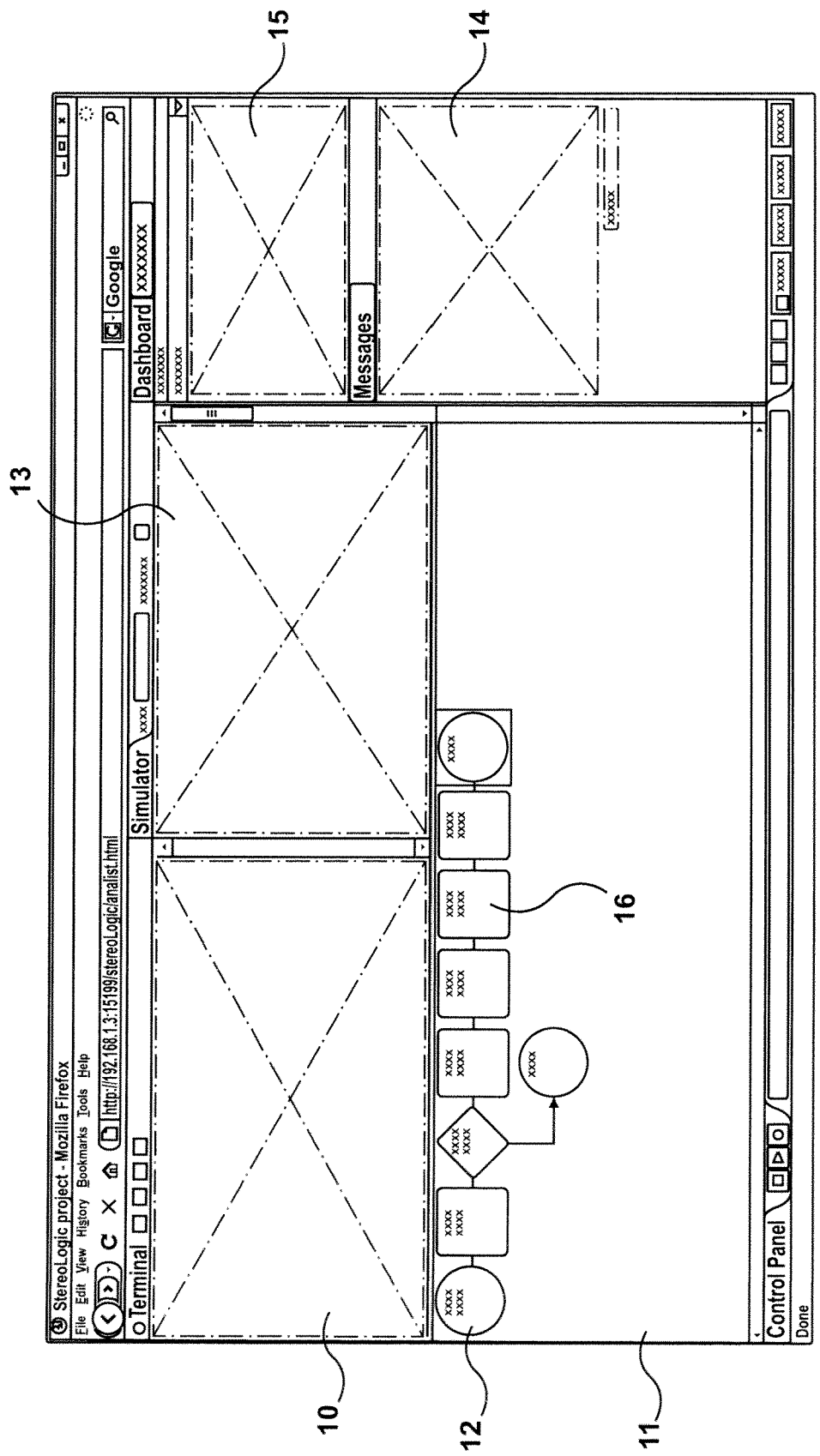
FIG. 1 illustrates a graphical interface of the system according to one embodiment.

FIG. 1 shows an example graphical user interface (GUI) of an embodiment of the business process modeling system herein. Some of the functions and methods of the business process modeling system can be understood by reference to the GUI elements. As shown in FIG. 1, the GUI includes a terminal element (10), which represents information received via a connection to a software application, typically a legacy software application that is running on a legacy system such as a mainframe computer or the like. For ease of reference, the software application will be referred to as a terminal software application. The information from the terminal software application may be received in real-time or may be retrieved from a stored history of activities on the terminal software application. The GUI also includes a process editor element (11), which presents information relating to a business process that is developed based on activities in the terminal software application. The GUI may also include a simulator element (13), which present information previously recorded during use of the terminal software application.

The GUI may also include a communication element (14) that allows users to communicate with each other using, for example, an instant messaging protocol or the like. For example, the user of the business process modeling system may communicate with the user of the terminal software application to ask about why a particular action was taken during use of the terminal software application.

The GUI further includes a dashboard element (15) that is intended to provide additional information relating to a business process that is highlighted (selected) within the business process editor window. For example, the dashboard element may display variables, attributes, functions and the like that are represented on a terminal software application screen during the selected business process element.

Figure 2:
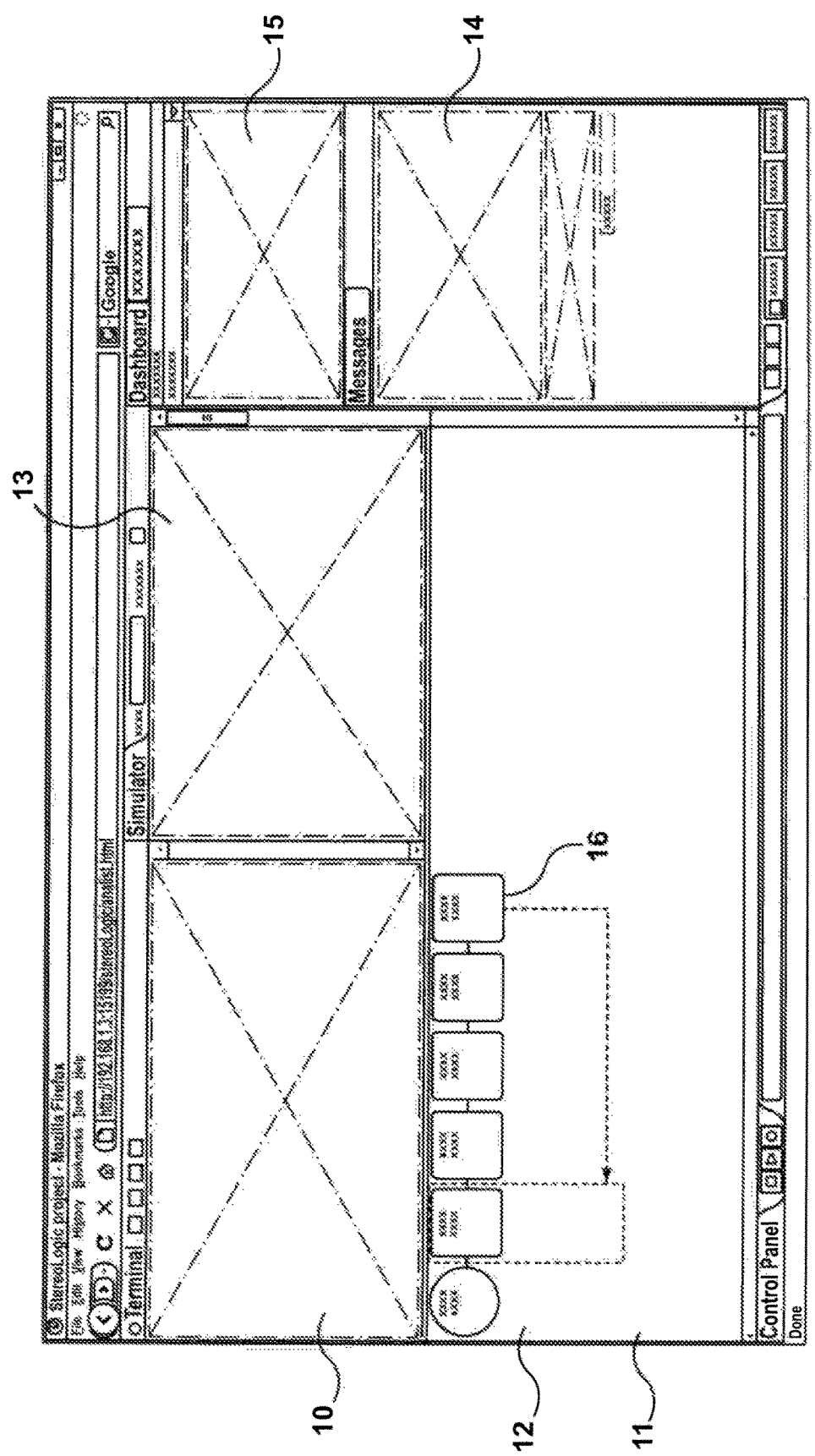
FIG. 2 illustrates the moving of business process steps within the system as shown in FIG. 1.

In one aspect of the present system and as shown in FIGS. 1 and 2, a business user works through the terminal software application via remote terminal (10) and related business process are automatically extracted and visualized in the business process editor (11). The revealed business process flow (12) may be then simulated, validated and changed in real-time.

In the Discovery 1 embodiment some computer assisted aspects include the following aspects which will be further understood from the description below and with reference to FIGS. 1-3:

1. when a user of the terminal software application makes any passes (real work) through the terminal software application, the terminal element (10) displays the information being seen by the user and a corresponding business flow element can be automatically reflected (displayed) in the business process editor element (11). In this embodiment, the business flow element may initially appear as a generic business process element, for example, without a title and with a generic shape. However, an additional mode may be included that allows Discovery 1 to recognize activity titles using text recognition algorithms which may recognize text elements of the screen automatically. An example of a text recognition algorithm is provided below.

2. screens that have passed in the terminal (10) may be collected, recorded and analyzed and may be later displayed in the simulator to the business flow with a corresponding (activating/highlighting) of flow elements (12) in the business process editor (11).

3. by comparing current screens in the terminal with previously collected screens in the simulator (13), a BP user can adjust the business process flow based on the results of this comparison change by, for example, changing the direction and control (continuation) points of the business process flow (12) development in the business process editor (11). In particular, this means that a BP user may continue flow development from any previous activity on the business process or from even a new point (element or cell) on the BP editor (11). In other words, a BP user may change the flow direction and starting or continuation points (control) points.

Figure 3:
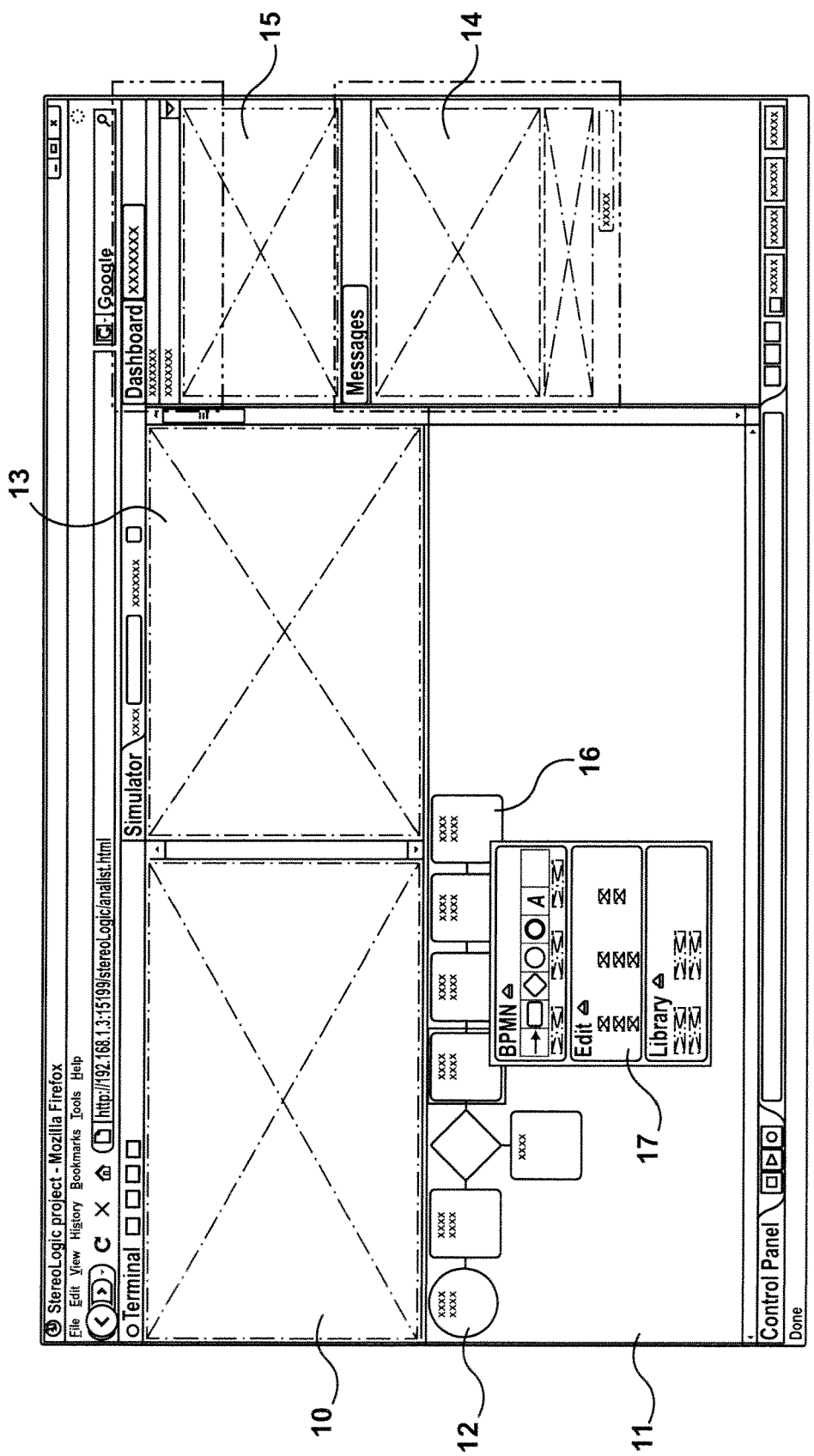
FIG. 3 illustrates the editing of business process steps within the system as shown in FIG. 1.

4. a BP user may also introduce decisions (rhombs) automatically between any two (or more) activities/elements of the business process in order to create branches or the like, see, for example, FIG. 3, editor toolbox (17).

5. a BP user may put some titles/information inside of the activities (including conditions), using, for example, a selection and highlighting corresponding fields/texts (elements) in the terminal (10) or simulator screen (13) or using editor features. Thus, the analyst user may semi-automatically create business processes, visualize, validate them and make changes in real time.

6. The dashboard (15) may allow an analyst to see in real time which processes the terminal user works with generally and which process is currently activated. This may be available for both the terminal (10) and the simulator (13) elements.

Figure 4:
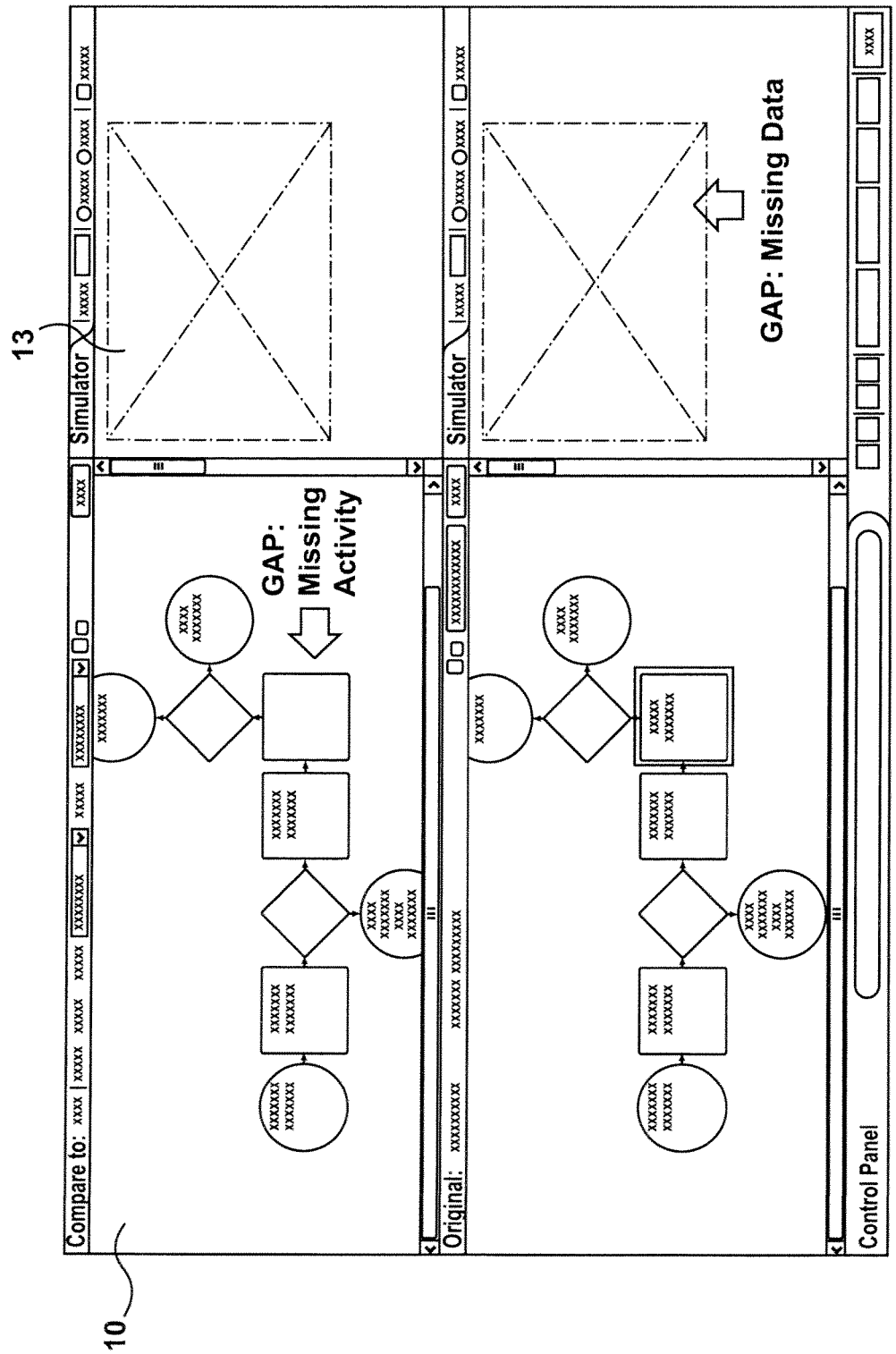
FIG. 4 illustrates an example of gap analysis within the system as shown in FIG. 1.

Discovery 1 as well as Discovery 2 embodiments further provide for gap analysis between processes and the information associated with these processes as shown in FIG. 4. Any two business process flows (12) may be monitored and compared. Concurrent simulation of multiple processes may be accomplished as well as the cross analysis of process screens and data. This analysis provides for the automated identification of gaps within the process or processes.

Figure 5:
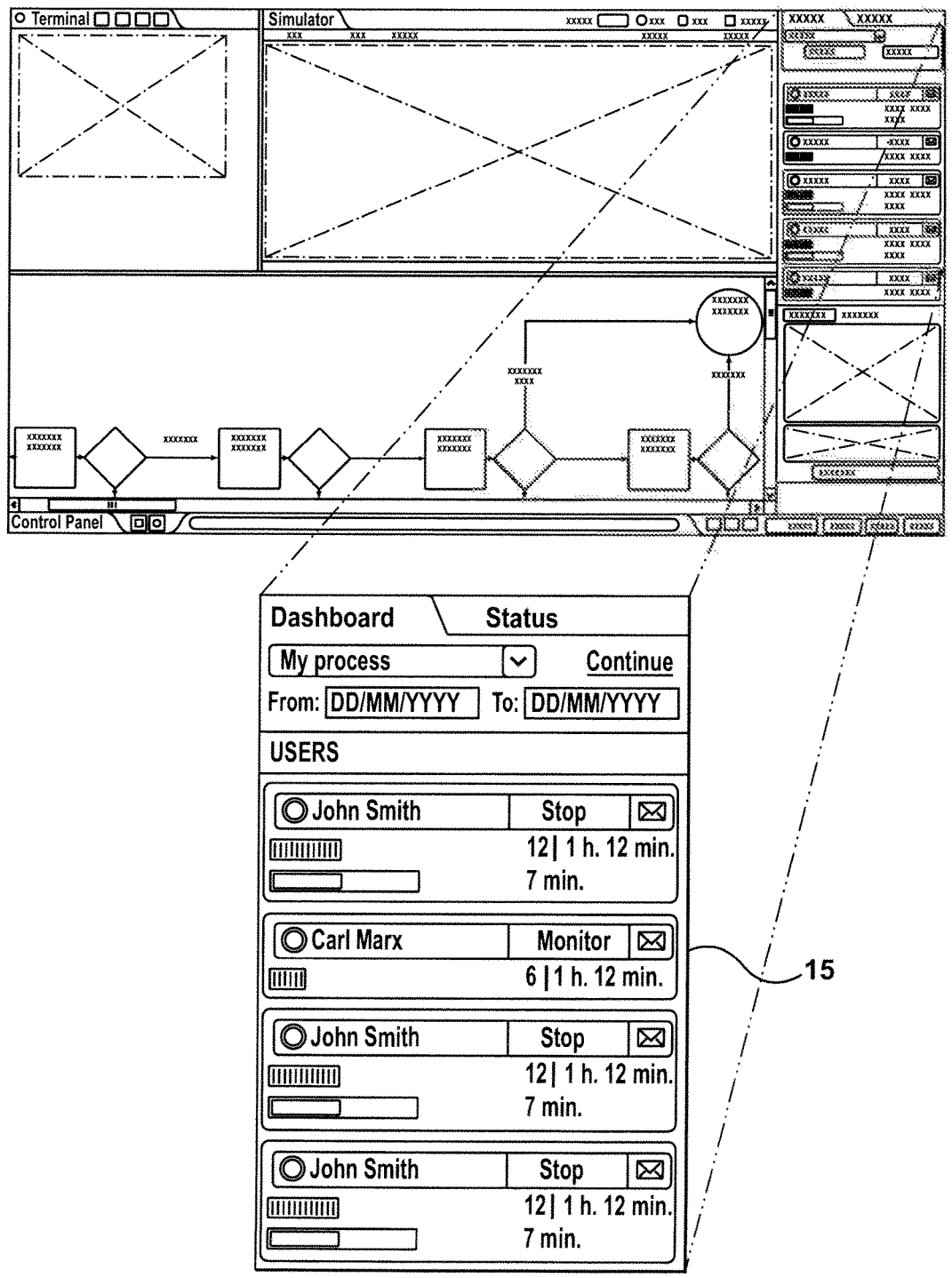
FIG. 5 shows an exploded view of the dashboard within the system as shown in FIG. 1.

Multiple users may discover business processes simultaneously and effectively communicate in Web 2.0 environment, via, for example, the instant messaging application (14). The dashboard may display the active users and the processes they are working on (15). As illustrated in FIG. 5, the dashboard in the Discovery 2 model may display various statistics about the users and the activities including: time spent by business user for each BP activity; time spent on the overall BP; and other process performance characteristics. This information allows for the analysis of the business process and of employee efficiency and may aid in determining business process bottlenecks. The system further provides for process discovery and performance management simultaneously and in real time.

Some differences between Discovery 2 and Discovery 1 include:

Discovery 2 uses algorithms that allow for the fully automated discovery of BP, for example, screens, identity between screens/flows, synthesis of resulting BP based on recognized flows and their relations, text recognition of definitions of BP activities; whereas, Discovery 1 allows the synthesis of BP to be done by a user/business analyst (human being) with computer-aided facilities (methods and algorithms), that help the analyst to do this work.

In some cases, the discovered business processes (12) may be automatically exported into other applications such as Microsoft Visio™ and IBM WebSphere™ Business Modeler.

The business process user or analyst may work through the application via remote terminal, while the record button is pressed, and related business flow element or activities (16) may be automatically created activity by activity. Corresponding activity data, for example, keystrokes, input data, and the like, for each screen may also be recorded.

The revealed flows (12) may be automatically simulated in the simulator (13), which may also be shown as BPM, screen by screen.

Information about each BP activity (16), activity content, may be automatically copied from the simulator screens (13) or terminal screens (12) by highlighting corresponding text (data) on the screen and choosing the copy button on the toolbar: The text or data may then be pasted into the business process element/activity to provide a label.

The present systems and methods for business process modeling may allow for the comparison of the current screen on the terminal (12) with previously recorded simulator screens (13). In a situation where a current screen is identical to a previously simulated screen, the analyst may choose to continue recording the business process from the existing activity corresponding to the identical simulated screen.

When there are identical screens, there can be two cases:
a. Flow is repeated—newly created activities are identical to previously recorded activities on the considered flow.
b. Fork—newly created activities are NOT identical to previously recorded activities on the considered flow.

In case (a), the system may collect the new information, but a new flow is not created in the business process editor (11). The activity history may be updated and may be viewed later. In case (b), the business analyst may insert a decision element by selecting a related BP element in the BP editor. FIG. 2 illustrates the ability to select and drag or move a task in the business process flow (12) while FIG. 3 illustrates a menu or toolbox (17) displayed where a user may edit the business process flow (12) or a specific business activity (16). As mentioned above, FIG. 4 illustrates an example of gap analysis and FIG. 5 shows an exploded view of the dashboard (15).

The discovered business process (12) may be changed using the business process editor (11). The editor is intended to be user-friendly and highly automated. In this embodiment, the BP editor comprises a plurality of modifiable cells. Each of the modifiable cells may be replaced by some graphical element, chosen from the menu associated with the currently selected cell. Conjunctions between graphical elements in adjacent cells may be performed automatically by the system. The user is not required to lay out the business processes or other diagrams as the system has the ability to do so automatically. FIGS. 1 to 5 also show examples of the business process editor (11) that may be used by an analyst to make changes to the business process flow (12).

The embedded dashboard (15) displays the active users and the processes they are working on. The dashboard provides information about each process/element/activity that is displayed in the business process flow, the terminal or simulator screens or performance metrics for the chosen process and/or activity, as shown in FIG. 5. This information may include properties of the element such as name, associated data, or the like.

Figure 6:
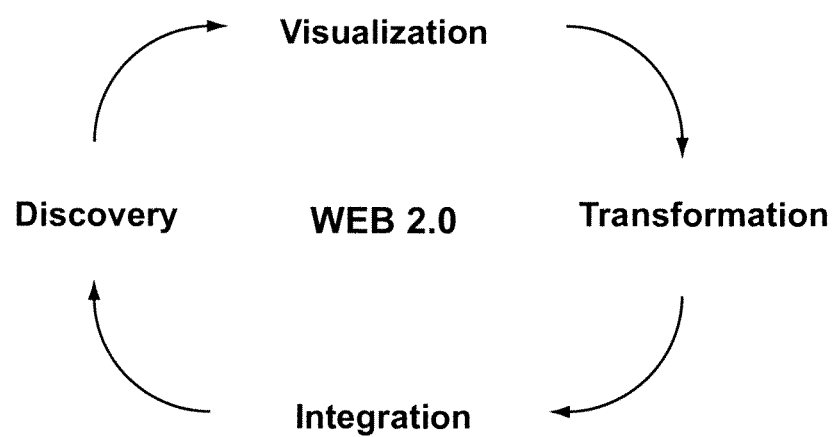
FIG. 6 illustrates a flow chart of the method for business process modeling within a web 2.0 environment.

One aspect of the methods and systems for business process modeling provides for an automated discovery of business process from existing business applications, including legacy applications, and enables business users to visualize, tune, transform and integrate these processes based on changing business needs as shown in FIG. 6. As the methods and systems may be Web 2.0 based solutions they may allow for real time collaboration among business users and processes discovery from IT systems located throughout the world.

In one aspect, the method provides for automated discovery of BP from existing business applications, including legacy; visualization, analysis and tuning of the BP; dynamic transformation and integration of BP's to support business change and global real-time collaboration in Web 2.0 environment.

Figure 7:
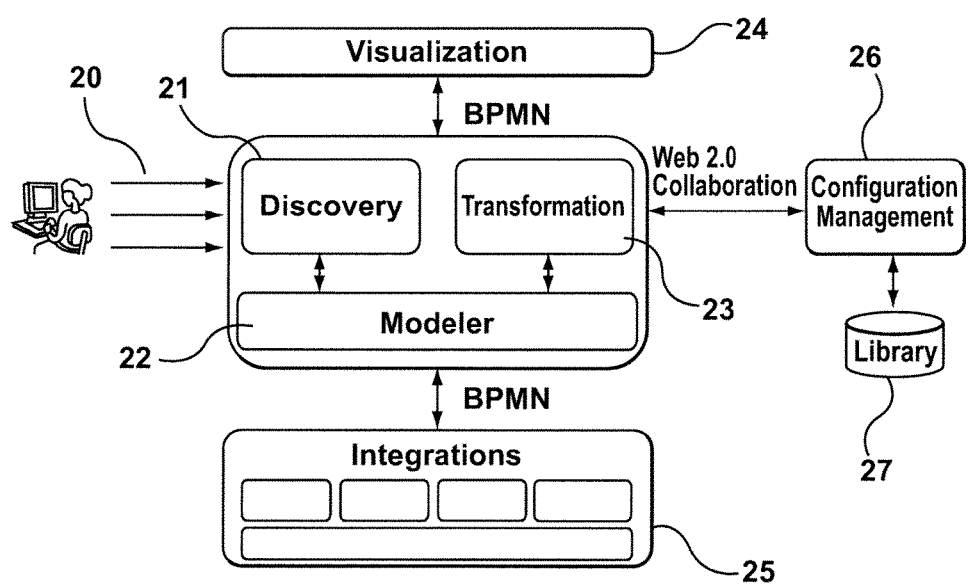
FIG. 7 illustrates components of one embodiment of the system for business process modeling.

FIG. 7 illustrates a conceptual architecture of the system according to one embodiment. There may be three basic source of input information (20) including systems (typically mainframes using legacy systems), humans, including users and process analysts, and documentation. These sources may interrelate and support information exchange. Business information from all three input sources (20) may be accumulated and may increase the veracity of the business process discovery.

The input sources may enter the discovery element (21), which interacts with the modeler (22). The modeler (22) further interacts with the transformation element (23). The combination of this information is relayed to the visualization component (24), which may display the business process according to BPMN standards. The combination of the information may also be integrated with known third party applications as mentioned above through an integration component (25).

In one aspect of the present system for business process modeling the collected information may also interact through web 2.0 collaboration with a configuration management component (26). The information may then be stored for further use and easy recovery in a database or library (27).

Figure 8:
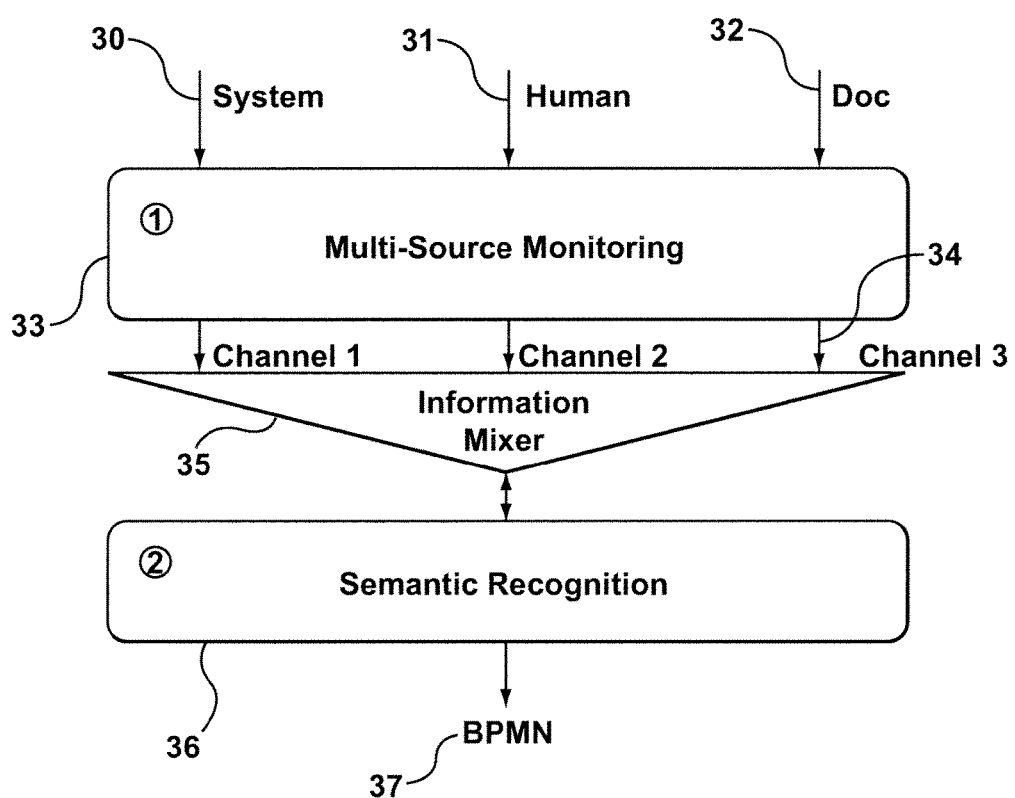
FIG. 8 illustrates in flow chart form the steps required for the business process modeling method.

In one aspect of the business process discovery method and system, multi-source monitoring may be used. In this monitoring method and system, as shown in FIG. 8, the monitoring of information is performed from input sources, which may be any combination of system (30), human (31) or documentation (32). The multi-source monitoring component (33) may monitor these and other possible sources and provide information to the information mixer (35) through at least one channel (34). The sources may interact or their provided information may intermingle in the information mixer (35) based on control signals from the semantic recognition module (36).

The semantic recognition of business process may be a continuous multi-level conceptualization of physical information by applying specifically designed patterns for recognition, identification and classification. The result of the semantic recognition of business processes in terms of standard BPMN specification (37) may be accomplished. The patterns are described in further detail below.

User instructions, including comments and answers inputted into the system, and documents are associated with corresponding activities of the information flow. The end of the information flow is generally recognized based on user instructions. A fork may be confirmed based on applying corresponding patterns.

The methods and systems provide for multiple recognition levels. In the semantic recognition of logical screens and flows the system may be able to identify logic screens and recognize their key semantic elements. The elements may include representation elements; data names; data; action names; real actions; administrative messages; and/or other attributes.

The method comprises identifying input and output screens from the information flow, then identifying what physical fields are on screen by using the protocol syntax. The protocol syntax may include identifying marks pointing to these physical fields. The method further recognizes semantic information by applying patterns to the set of physical fields. The patterns may be defined by a combination of key parameters, as shown in Table 1, and their relations. Boolean expressions or other formal models, including but not limited to Petri Nets and Neural Nets, may define the relations.

| Key Field Parameters | Meaning | Value | | Comments |
|---|---|---|---|---|
| P | Protected/ Unprotected | Protected = 1 | Unprotected = 0 | |
| V | Visible/ Invisible | Visible = 1 | Invisible = 0 | |
| CL | Color | Defined by number from 1 to 16 | | |
| P, | Pen | Defined by number from 1 to 4 | | Depends on the model of the terminal |
| POS | X, Y Start coordinates | X = 1 . . . 80 Y = 1 . . . 24 or 1 . . . 32 | | |
| C | Content | Combination of symbols | | Depends on the model of the terminal |
| S | Sound | TBD | TBD | |
| A | Enter/Aid no Enter/Aid | Enter/Aid = 1 | No Enter/Aid = 0 | |
| N | Sequence number of the field | Integer | | Order number of the field |

The pattern for semantic elements, called Representation Elements, may be further defined by logic relationships. Key field parameters in this relation may include P, V and C where the P value would be 1 if the field was protected and 0 if not protected, V would be 1 if visible and 0 if not visible, and C would have the value of 1 if at least one symbol belonged to the set of {(A-Z), (a-z), (0-9)}, otherwise, it too would be 0. A Boolean expression, using & for AND, ∨ for OR and ¬ for NOT, may be defined as a function of R1 where R1 is a relation between physical elements presented in Table 1 as defined below:

$$R1 = P \& (V \& \neg C \vee \neg V) \tag{1}$$

The patterns for data names and data may also be determined by the method. One example, which may apply to field 1 and field 2 as 2 neighboring fields, and may contain the key field parameters as shown in Table 2.

TABLE 2

| Key Field Parameters | Field 1 Values (label) | | Field 2 Values (data) | | Comments |
|---|---|---|---|---|---|
| P | 1 | | 0 | | |
| V | 1 | | 1 | 0 | |
| POS | Any | | 1 (Y$_2$ = Y$_1$) & (X$_2$ > X$_1$) | 0 | Coordinates of field2 are defined in relation to field 1 |
| C | 1 T*A T* S N* T - any character A - {(A-Z), (a-z), (0-9)} S - {.+=:> - _} N - {space, null} | 0 | T* | {Not C1} | Looking for text like the example: LABEL: VALUE |

TABLE 2-continued

| Key Field Parameters | Field 1 Values (label) | Field 2 Values (data) | Comments |
|---|---|---|---|
| N | Any | 1<br>$N_2 = N_1 + 1$ | 0<br>$N_2 \mathrel{!=} N_1 + 1$ |

The relation, R2, may then be defined as follows, with subscript 1 referring to field 1 and subscript 2 referring to field 2:

$$R2 = P_1 \& \neg P_2 \& V_1 \& POS_2 \& C_1 \& N_2 \qquad (2)$$

Other possible patterns for detection of data labels and data fields may be defined similarly to the above relations.

A third pattern may apply to action labels. The key field parameters for an individual field are shown below in Table 3.

TABLE 3

| Key Field Parameters | Values | | Comments |
|---|---|---|---|
| P | 1 | | |
| V | 1 | | |
| POS | Any | | |
| C | 1<br>T*K S* T*<br>T - any character<br>S - {.+=:> - _"space"}<br>K - {(F1-F24), (PF1-PF24), (PA1-PA3)} | 0<br>{Not C1} | Looking for text like the example:<br>F1 - Submit Application |

This relation may be defined as R3 below; although, other possible patterns for detection of action labels may be defined similarly.

$$R3 = P \& V \& C \qquad (3)$$

A further pattern applies to administrative messages. This pattern would apply to at least one field and the key field parameters are shown below in Table 4.

| Key Field Parameters | Field 1 Values (label) | Field N Values (data) | Comments |
|---|---|---|---|
| P | 1 | 1 | |
| V | 1 | 1 | |
| C | 1<br>T*A T*<br>T - any character<br>A - {(A-Z), (a-z), (0-9)} | 1<br>T*A T*<br>T - any character<br>A - {(A-Z), (a-z), (0-9)} | |
| N | Any | Any | 1<br>$N_2 = N_1 + 1$ |

This relation may be defined as R4 below. The terms $\neg R2 \& \neg R3$ are included to differentiate the administrative information from data and function key labels.

$$R4 = P \& V \& C \& N_2 \& \neg R2 \& \neg R3 \qquad (4)$$

The semantic screen recognition process may obtain the following information: a set of key semantic elements for each logic screen; input and output logic screens and their respective flows and dynamic parameters of activated data and real action that characterize execution flows. Input screens may represent dynamic actions, modified data or real actions. Activated data is data that was modified by a user during the user-system interaction while real actions are executed by the user during the user-system action.

A second recognition level provides for identity recognition between flows and screen logic. Identity recognition among logic screens allows the system to conduct a transformation from many screen instances to generalized logical activities of the business process flow. Identity recognition among the logic flows allows for the transformation from many flow instances to a generalized business process flow. In input screens, it may be necessary to identify the different input identities including but not limited to data identity; real action identity; strong input screen identity and soft input screen identity.

Unlike humans, computers may not be able to recognize that many separate screen instances actually represent the same business process activity. The screen identity recognition method provides for rules that allow the system to recognize business activities presented by the plurality of screens. Flow identity recognition provides for further rules that allow the system to recognize one generalized process flow in a set of flow instances.

Example definitions for various types of identity between various screen elements are provided below. For data identity (di), multiple sets of data located on separate screens may be considered identical if the names of the activated or modified data are the same. This relationship may be defined for an input screen (in) as:

$$F^{in}_{di}(scr_1, scr_2) = 1 \qquad (5)$$

For real action identity (ra), real actions related to various screens may be considered as identical if they are the same action. This relationship may be defined as follows:

$$F^{in}_{ra}(scr_1, scr_2) = 1 \qquad (6)$$

Based on these element identity definitions, rules for defining screen identities are proposed below. A strong input screen identity may occur between two or more input screens if and only if there are both data and real action identity for these screens in terms of the above and shown in the relationship below:

$$F^{in}_{strong} = F^{in}_{di} \& F^{in}_{ra} \quad (7)$$

Soft input screen identity may occur if there is real action identity for these screens in terms of the real action identity shown above. This relation may be expressed in the below terms:

$$F^{in}_{soft} = F^{in}_{ra} \quad (8)$$

Similarly, the methods and systems of business process modeling also provide for output screen identity recognition. As for input screens, a data identity relation is also provided for in output screen logic, as are action names identity, representation identity and output screen identity.

For data identity, multiple sets of data located on various screens may be considered identical if all the data names are identical and all data are identical (position, appearance etc.), excluding the data's volume and values. In other words, all key related physical parameters defined in the recognition level above are identical. This relationship may be defined for an output screen (out) as:

$$F^{out}_{di}(scr_1, scr_2) = 1 \quad (9)$$

Two or more sets of action names (an) located on separate screens may be considered as identical if the number of action names and their identifiers, key related physical parameters, fully match. This relationship may be defined as follows:

$$F^{out}_{an}(scr_1, scr_2) = 1 \quad (10)$$

Representation of multiple screens may be considered as identical if representation views (r) fully match. The number of representation elements may not match but all key related physical parameters defined in the recognition level above are equal.

$$F^{out}_{r}(scr_1, scr_2) = 1 \quad (11)$$

An output screen identity may be considered as strong (s) identical screens if and only if all of the above identity conditions are satisfied.

$$F^{out}_{s} = F^{out}_{di} \& F^{out}_{an} \& F^{out}_{r} \quad (12)$$

A third level of recognition is also provided: the business process recognition level. Input and output screens defined with these relationships may be considered input and output logical activities. A process flow identity may be defined if two process flows are identical, for example, if corresponding logical activities for each flow match each other and sequences of activities are the same.

The methods also provide for algorithms, which may recognize business process elements and activities. Once such method is provided as an example below, detailing a real-time text recognition algorithm that includes the ability to search patterns on the terminal software application.

The text recognition method extracts relevant title/activity name information from a given screen in real-time. This method may comprise extracting at least one sentence from the screen; weighing each sentence against a configurable rule set; and selecting sentences with larger summarized weight as the title/activity name, as described in further detail below.

Extraction of sentences and their underlying physical properties is based on a given definition of a sentence. A sentence may be defined a sequence of words with no less and no more than 1 space or null as delimiter.

In addition to space or null the following delimiters can be allowed as follows:

[space/null[0], space/null[0-1]];

a sentence begins with a word; and
a sentence ends when:
1. there is more than one delimiter between words;
2. non-word characters begin; if they begin after a delimiter such delimiter is discarded from a sentence as well;
3. end of current field;
4. end of Screen; and
5. a delimiter or a non-word character begins after a word character but one that should not end the word, both word and sentence will end.

In this particular embodiment, a word may be defined as a sequence of symbols beginning with [A-Z, a-z, 0-9] that can contain [A-Z, a-z, 0-9, -, \,/, @, .] and ends with [A-Z, a-z, 0-9] or end of field. Symbols such as a dash (-), slash (\ or /), at sign (@) or period (.) cannot occur more than one time consecutively and any consecutive sequence of [-, /, \, @, .] would typically signify the end of the word.

Other indicators that a word has ended (Word Terminators) are as follows:
1. a symbol that is not legal from words perspective, for example not {A-Z, a-z, 0-9};
2. end of underlying current field;
3. end of row; and
4. end of screen.

The method further provides for definitions of configurable measurement rules. A rule (R) may be defined as a function where: R(input sentence(S), other sentences, dictionaries, parameters)=$W_{RS}$. $W_{RS}$ denotes the resultant weight for the input sentence. Rules may be denoted through Boolean algebra and regular expressions and may be presented in, for example, XML or other languages.

The rules may be used to give preferred weight to sentences which meet the following criteria:
that are meaningful, for example, sentences which contain words that are present in language or process specific dictionaries;
whose physical properties or content make them stand-out compared to the rest of the screen; and/or
whose physical properties, location on screen and/or content suggest title.

Table 5 further illustrates how such rules may be weighted.

| RULE | EXPLANATION (INPUT SENTENCE S) | SUGGESTED WEIGHT RANGE |
|---|---|---|
| MEANING | LET M BE TOTAL NUMBER OF WORDS IN S. LET N BE TOTAL NUMBER OF WORDS IN S THAT COULD BE FOUND IN GENERIC OR SPECIFIC DICTIONARIES. LET X = N/M.<br>THEN     X = 1 AND 2 <= M <= 4 ->W = +3<br>            X = 1 AND M > 4 ->W = +2<br>            X = 1 AND M < 2 ->W = +1<br>            0.5 <= X < 1 ->W = +1<br>            0 < X < 0.5 ->W = +1<br>            X = 0 ->W = -2 | [-2 . . . +3] |

| RULE | EXPLANATION (INPUT SENTENCE S) | SUGGESTED WEIGHT RANGE |
|---|---|---|
| Row LOCATION | $0 < L_{RS} <= 3 \rightarrow W = +1$<br>$L_{RS}$ IN LAST TWO ROWS $\rightarrow W = -1$ | $[-1 \ldots +1]$ |
| COLOR DIFFERENCE | LET C BE THE COLOR OF S. SUM UP ALL SENTENCES AND NON SENTENCE CONTENT HAVING THE SAME COLOR — DENOTE THE SUM BY $N_c$<br>SUM UP ALL OTHER SENTENCES AND NON SENTENCE CONTENT BY THEIR COLOR.<br>IF $N_c$ IS THE SMALLEST NUMBER AND $N_c$/TOTAL NUMBER OF SENTENCES AND NON SENTENCE CONTENT $<= 1/6 \rightarrow$<br>$W = +1$ | $[0 \ldots +1]$ |
| PEN DIFFERENCES | SIMILAR TO COLOR | $[0 \ldots 1]$ |
| COLUMN LOCATION | SIMILAR TO COLOR, AND PEN BUT DEALS WITH COLUMN POSITION. | $[0 \ldots 1]$ |

Figure 9:
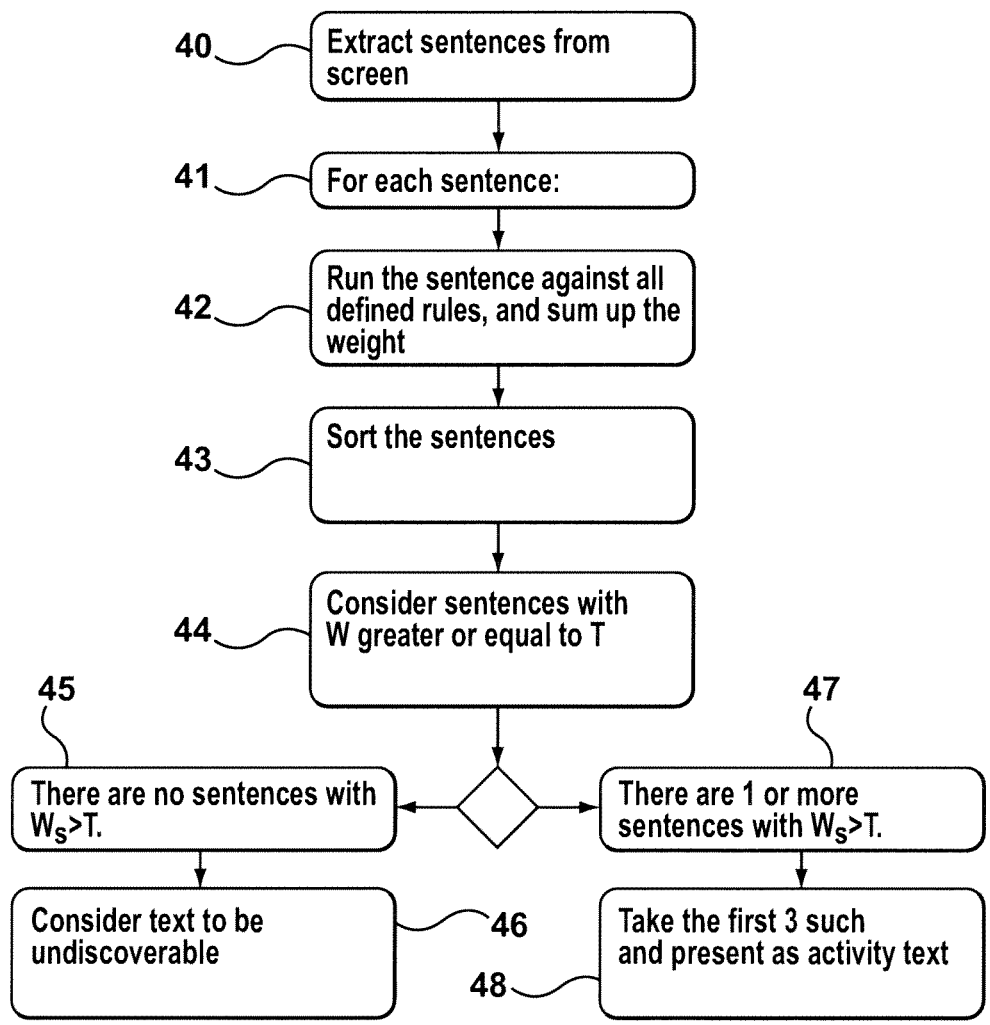
FIG. 9 illustrates a flow chart of a text recognition method according to one embodiment of the business process modeling methods.

The overall flow of an example recognition method is illustrated in the flow chart of FIG. 9. First, the sentences may be extracted from the screen (40) so that their specific physical properties may be analyzed. The algorithm may then review the specifics for each sentence (41). First the sentence will be examined with reliance on defined rules (42). As each rule has a defined weight, the weight of the sentence may be defined as $W_s = \Sigma W_{rs1 \ldots rsn}$ where the weight W of sentences is the sum of the various weights of the rules $W_{rs1 \ldots rsn}$.

The sentences may then be sorted by their summed weight value $W_s$ in descending order (43). In this embodiment, only sentences with a weight value $W_s$ greater than or equal to a predefined threshold value (T) (44) will be considered for an activity name or title. If no sentences within the screen have a weight value $W_s$ greater than T (45) than the text to define the activity name or title might be considered undiscoverable by this method (46).

If there is at least one sentence that has a weight value $W_s$ greater than T (47), an activity name will be defined. The method may further select the at least one and, for example, up to three sentences with the greatest $W_s$ values and order them by, for example, their start location (48). These sentences may then be displayed as the activity text or as optional choices for the activity text.

Figure 10:
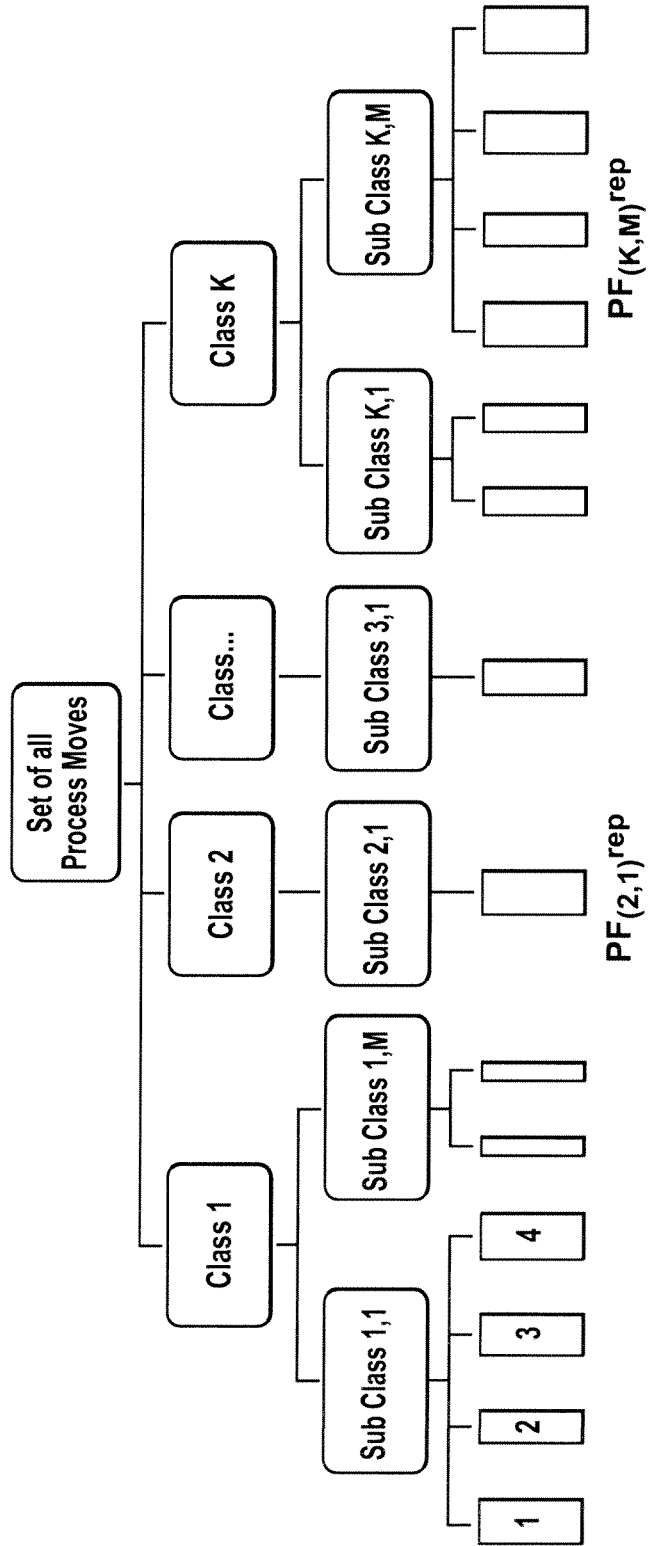
FIG. 10 illustrates that break down of the business process method into the components.

In looking at process flows, the method and systems for business process modeling herein comprises: partitioning the set of flows (F) into equivalent classes of flows which includes subdividing a set of defined process flows into equivalent classes ($CL_{1 \ldots k}$) based on the identity of end logical activities of the flows; partitioning of the class of flows into equivalent sub-classes of flows which includes subdividing a class of flows into sub classes of equivalent flows ($SCL_{1 \ldots m}$) based on flow identity criteria; and introducing process flow representatives for each sub class of each class $PF_{(k,m)}^{rep}$, as shown in FIG. 10.

Figure 11:
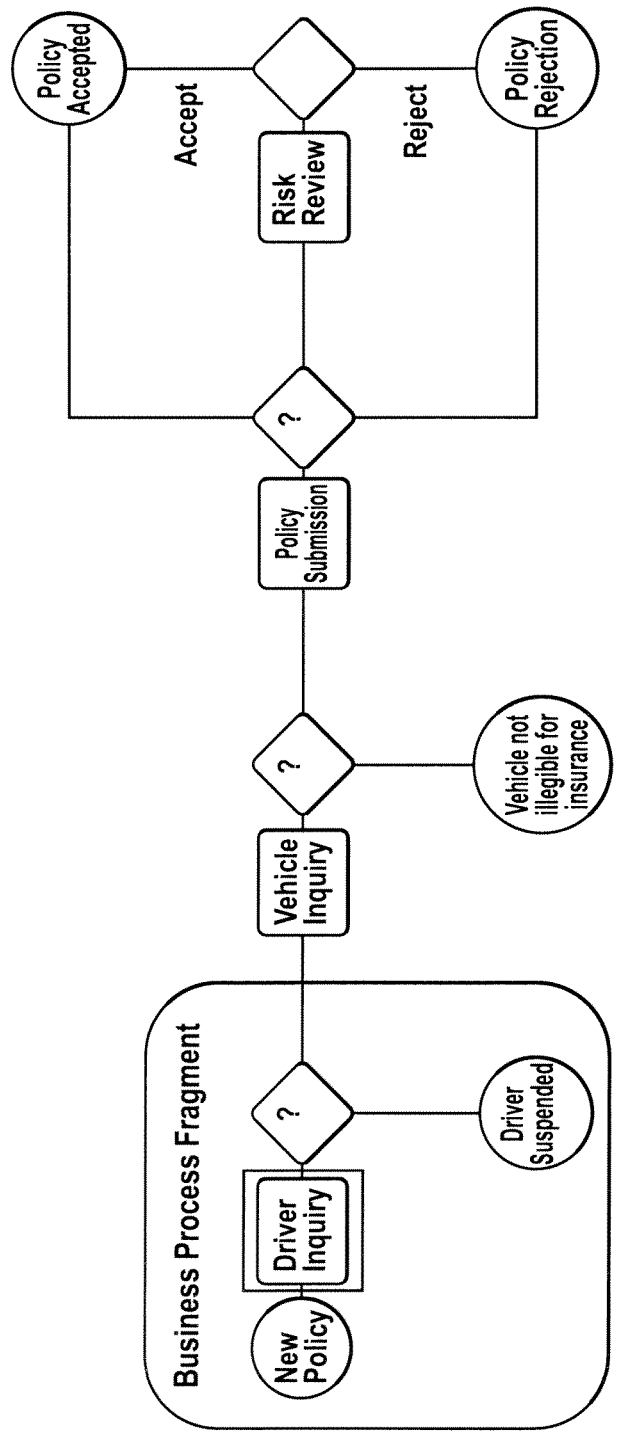
FIG. 11 illustrates a typical business process fragment.

The method may further provide for the recognition of a business process fragment for each CL(k) of set F comprising: finding flow intersection points Xi between representative flows; recognizing forks based on fork recognition patterns; defining flow convergence points as merges. The resulting set of interacting flows will be considered as a Business Process Fragment BPF(k), of CL(k). One example of a business process fragment is shown in FIG. 11.

Flow intersection point Xi may be a point where logical input or output activities from flows either start or stop being identical. These internal start and stop points may actually define the points of a start and stop for internal sub-flows for business process fragments.

A full business process for entire set F may be created by processing all business process fragments similar to processing BPF(k) for each class CL(k).

Figure 12A:
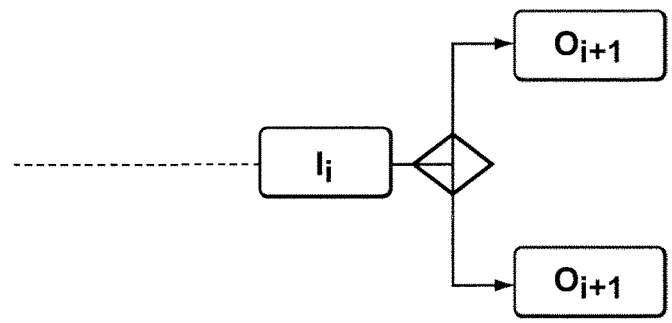
FIG. 12A illustrates a fork pattern.
Figure 12B:
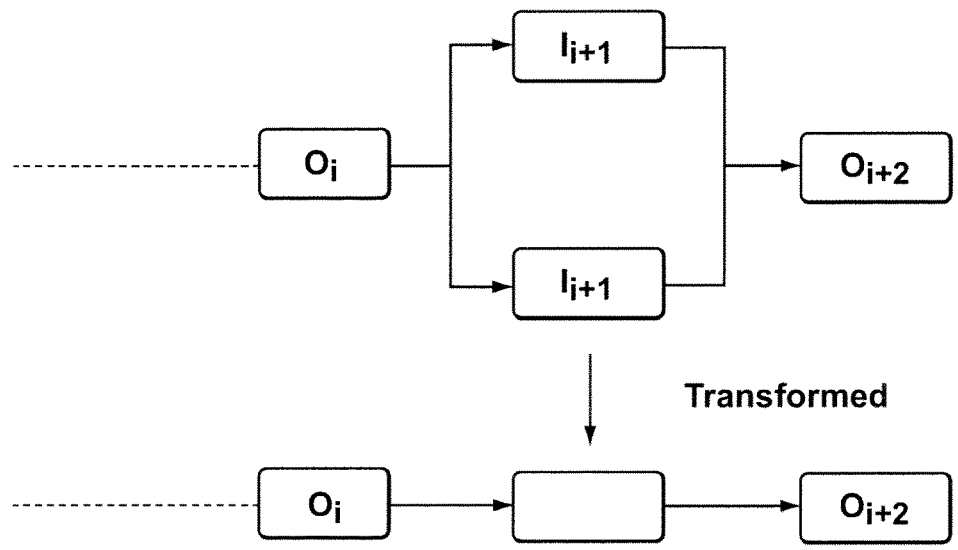
FIG. 12B illustrates an alternative fork pattern.
Figure 12C:
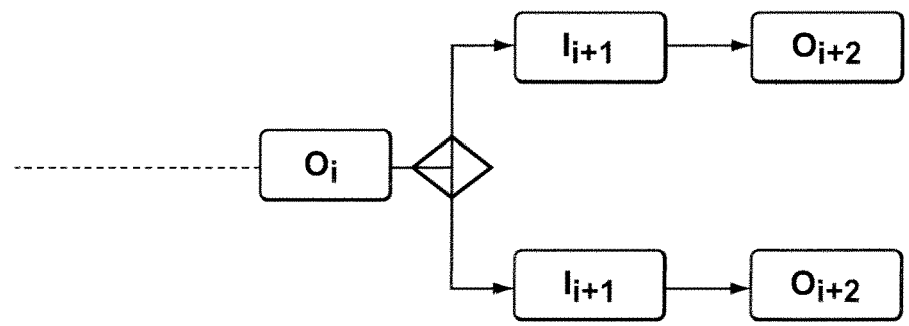
FIG. 12C illustrates another alternative fork pattern.

Various fork patterns are illustrated in FIGS. 12A to 12C. An input fork, FIG. 9A, occurs when flow patterns stop being identical after a logical input activity. This case may occur with a strong input identity or a weak input identity. In a strong input identity the internal state may cause the fork while in a weak input identity the input data or data and internal state may cause the fork.

A second fork pattern may be an anti-output fork, FIG. 12B, where the flows may stop being identical after a logical output activity. The input activity may occur when input data are identical but real actions may differ. These fork patters may occur when action names are synonyms or the next following output belongs to an error handling flow or a combination of these events.

A third fork pattern, the output fork shown in FIG. 12C, may occur after the flows stop being identical and continue to remain separate. This fork may occur if the input data are identical but the real actions are different and a control action causes the fork or if the input data are different but the real actions are identical then the input data causes the fork.

Another fork pattern may be an output fork with following merge. Here the input data and/or real actions are different but due to an error handling flow the output may merge from the various input activities.

The methods and systems further provide for discovery of business processes and odd process scenarios. In this case a BP user may record a baseline for a business process using Discovery 1. For each activity in the baseline process, the analyst may define a set of identity rules that describe the minimum criteria for a screen to belong to the activity. These rules may be defined using a combination of Boolean algebra and regular expression equations using as arguments screen locations and physical properties of each location Multiple rules may be connected by AND, OR or XOR Boolean operators. For example, location may be defined as cell on the screen. A standard 24×80 mainframe screen gives 1920 locations. Each location may have physical properties and content associated with it.

The system may monitor multiple business process users and may gather the screens with which the BP users are interacting. Each new gathered screen may be tested for identity based on the previously defined identity rules. If a given screen satisfies the set of rules defined for some activity of the baseline process, the system may then associate the screen with this activity. Screens that are not associated with a baseline activity form new sub-flows marked for user analysis.

For the new sub-flows, new forks and merges may be identified based on the identity rules and may be added to the baseline process. The corresponding decision points may also be marked for user analysis.

The new process is presented to a BP analyst. The BP analyst may establish identity rules for new activities, combine or separate screens into different activities, and/or otherwise tune the business process. Combining or separating screens from activities may automatically modify the underlying rules of the activities by changing the underlying Boolean algebra equations and running automated Boolean equation simplification process. Thus when process is repeated the screens will be identified to activities by using the modified rules.

The method above further provides for the definition of identity rules. Each rule operates on a consecutive set of locations. Each location L may be defined by a Boolean equation B, defining its physical properties such as Protected, Visible etc. and a Regular expression R, defining its content. The physical properties may be sourced from the protocol field identifying this location. Therefore each location can be expressed as L=[B AND/OR R].

A rule may be combination of multiple location equations, $L_{(1 \ldots p)}$, for consecutive locations separated by Boolean operators. For example, a rule R may be defined as R=L1 AND L2 AND (L3 OR L4).

Each rule may be given a start location. By default this location may be set to a specific value. Alternatively, a range of locations may be specified. In the case where a range is given, when a screen is checked against the rule, all locations in the range will be tried as the start location, until either the range is exhausted and the rule criteria were not met or the rule criteria are met with one location in the range as the start location.

The rules, $R_{(1 \ldots q)}$, are combined by Boolean operators. For example, the minimum criteria set for a screen may be represented by R1 AND (R2 OR R3 [0-1920]) although other expressions are possible. Rules may be defined through a graphical user interface.

The methods and systems also provide for learning by decision tree. If the BP user or analyst did not define the rules for an activity, or if system finds a new screen that does not satisfy any identity rules for any activity, the system creates a new activity and tries to define minimum rules for it automatically. These rules may include elements based on:

A) fields and their physical properties;
B) application of semantic element recognition patterns to determine which physical properties should be included in the rules in each location; and
C) application of repetitive table patterns.

These auto-generated rules may be either modified by a BP analyst manually or changed automatically when the BP analyst moves this screen to another activity or moves another screen to this activity. Once the activity is changed or moved the associated rules will again be modified to appropriately reflect correct identity rules.

Car Insurance Application Example

In one embodiment of the present methods and systems for business process modeling the methods and systems may be used to automatically discover a business process for a car insurance system that is implemented on a mainframe environment. The car insurance system allows business users to create applications for new insurance policies. The system checks driver and vehicle history to determine whether the information complies with insurance requirements. If the history check is positive, the system creates a new application.

Figure 13:
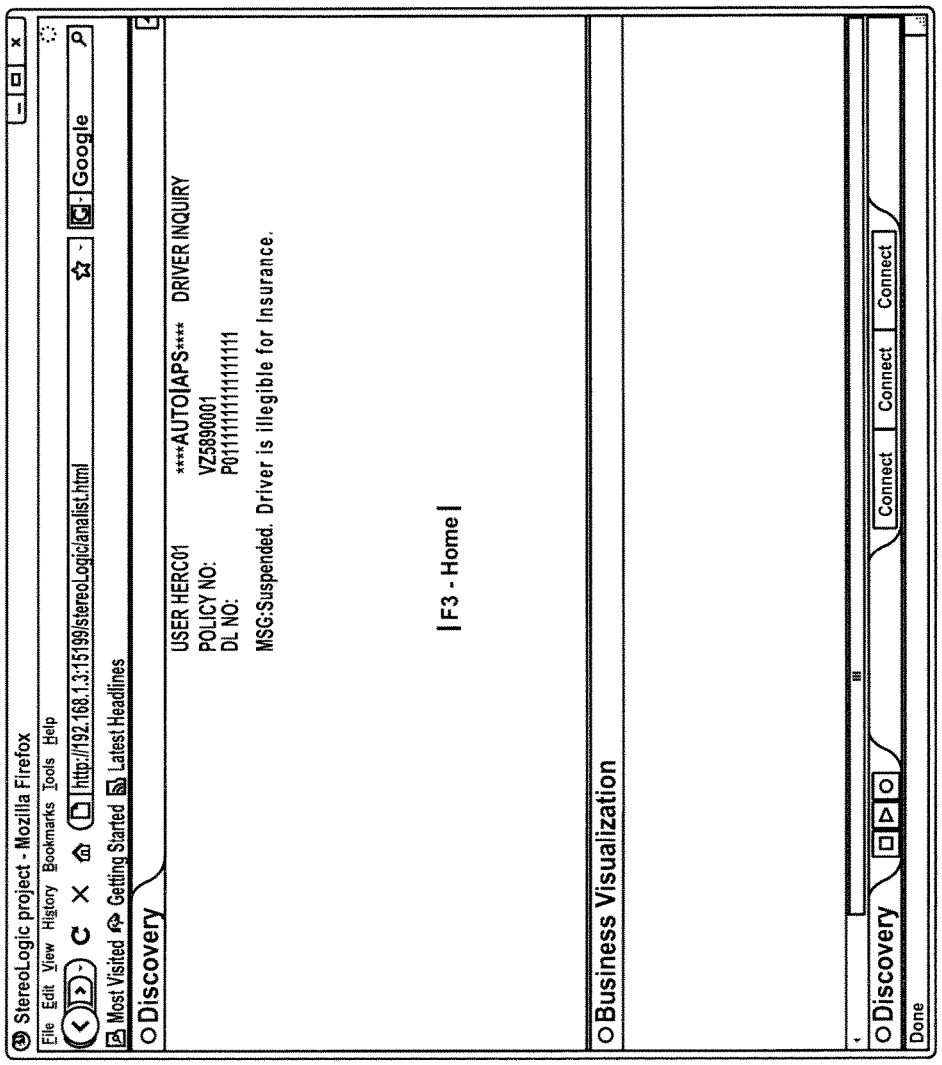
FIG. 13 illustrates a graphical interface of the system according to one example of use in a legacy application.

In this example, a terminal user may work through the car insurance application while the methods and systems for business process modeling review the actions and create a business process visualization as the user completes various actions. FIGS. 13 to 18 illustrate the various steps completed by the user in the car insurance application while the methods and systems for business process modeling displays the visualization of the process in the lower half of the computer screen. While the user works with the application, the system for modeling business process monitors the business information, which includes the business activities, data, content of screens and then synthesizes the business process. FIG. 13 illustrates a starting point, where the application has booted and the business process discovery is ready to begin.

Figure 14:
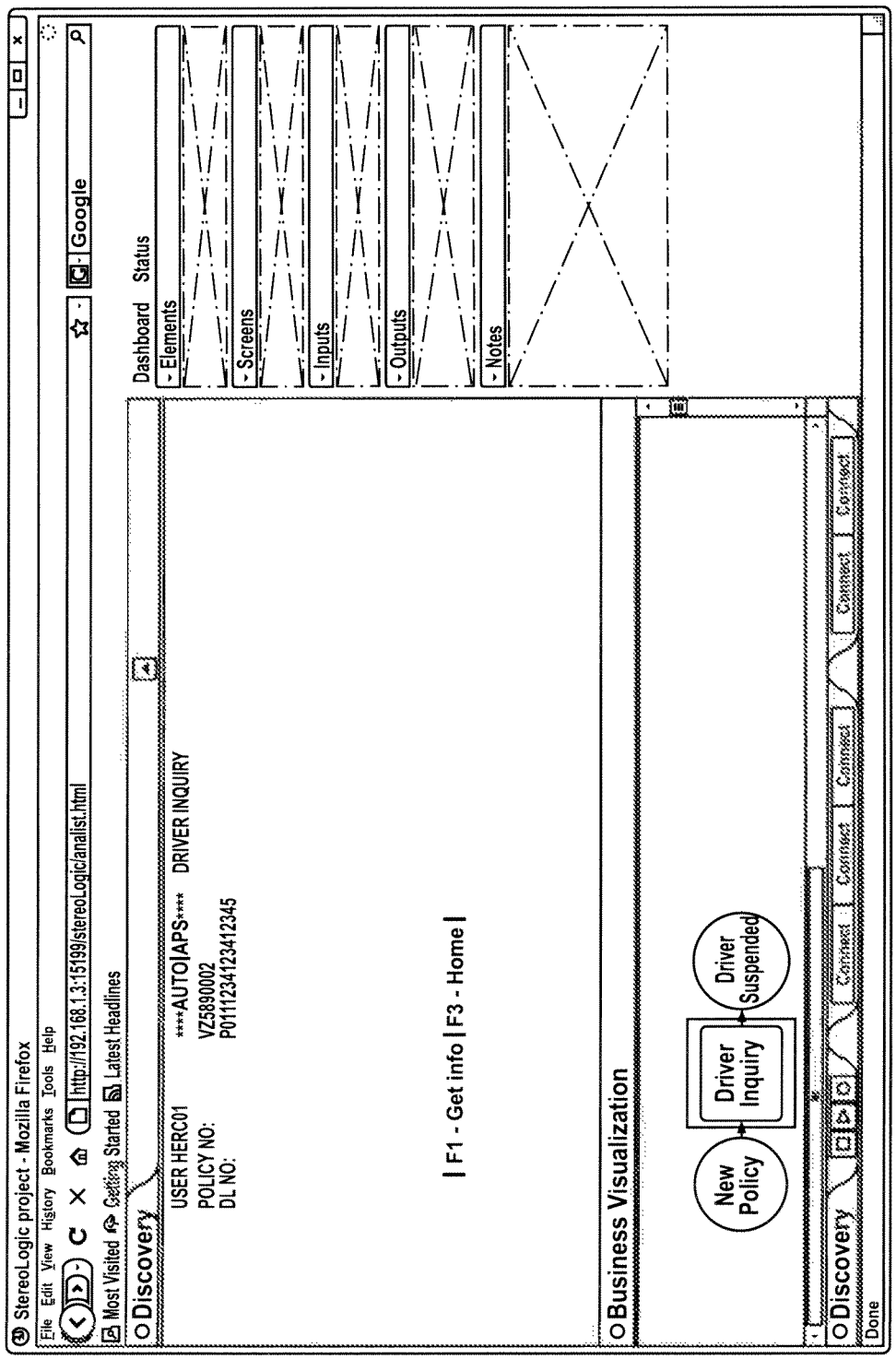
FIG. 14 further illustrates the system according to the FIG. 13 example.
Figure 15:
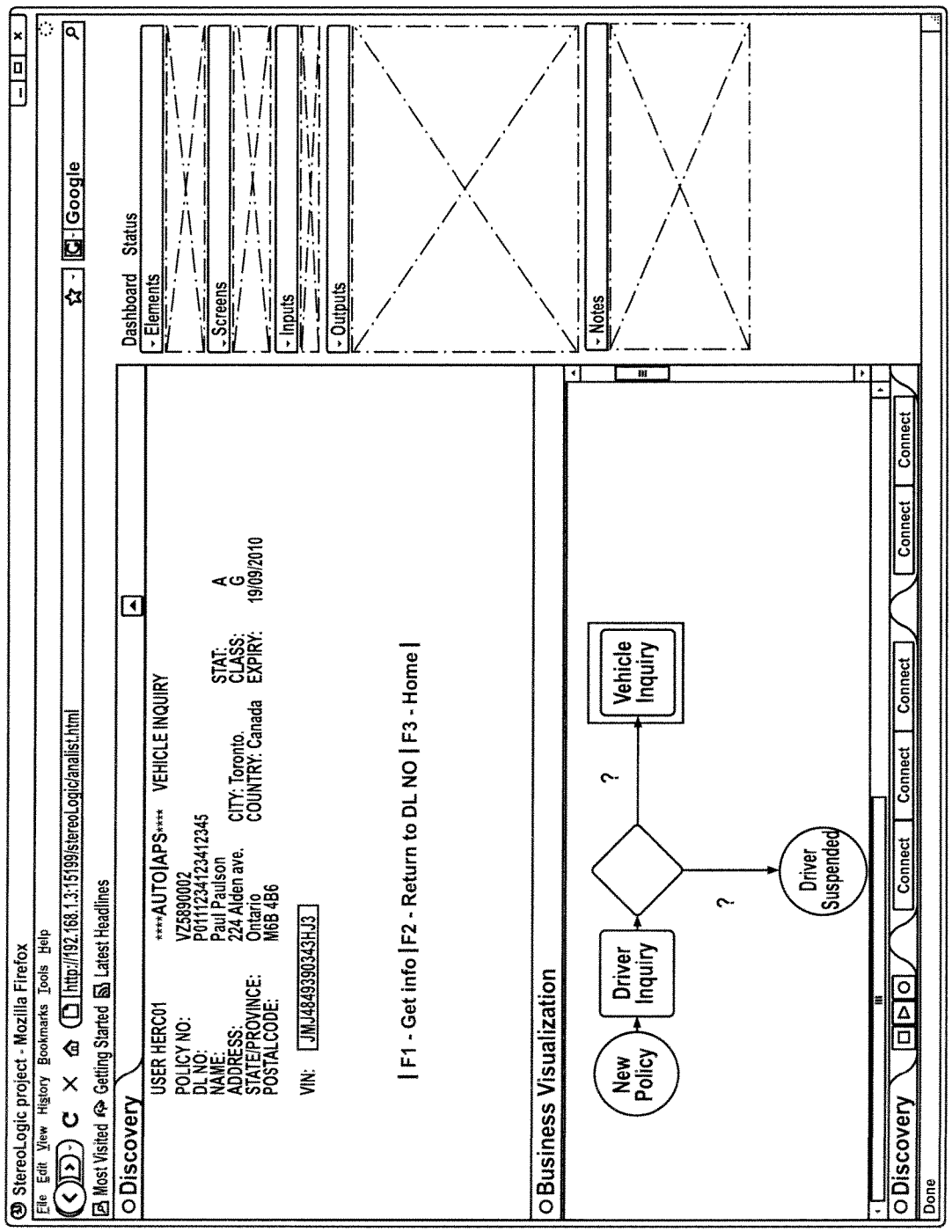
FIG. 15 further illustrates the system according to the FIG. 13 example.

One process may be that the terminal user enters an invalid or suspended driver's license number and the system will give the user the message that the driver is not eligible for insurance. Another option may be that the terminal user enters a valid driver's license number and obtains complete driver information and is then prompted for a vehicle inquiry. The business process modeling system continues to monitor the users working with the insurance system and accumulates the business information. As various forks are perceived the system and methods are able to evolve the business process. FIG. 14 illustrates this example application after three business process elements have been discovered, while FIG. 15 shows the application after a first fork is discovered.

Figure 16:
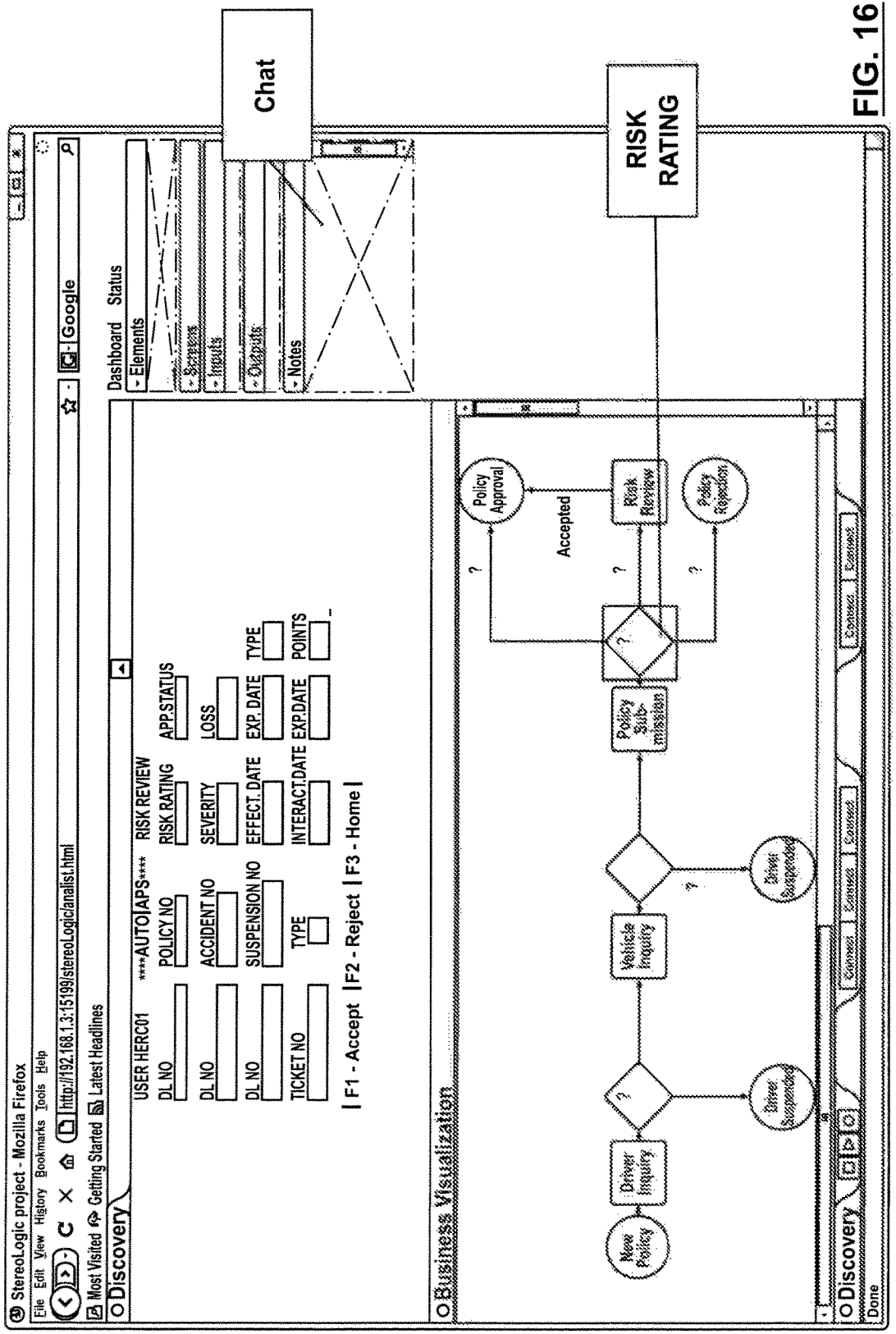
FIG. 16 illustrates third party application monitoring according to the system according in FIG. 13 example.

After multiple passes of the terminal users through the car insurance application system, the business process is discovered. The names of some of the process activities may be automatically determined. In cases where names are not determined, the BP user or the system may ask the terminal user questions via a built-in chat area as seen in FIG. 16. The answers provided by the terminal user may be automatically incorporated into the discovery process.

The methods and systems may provide various modes for the various users of the applications, including but not limited to, a business analyst, a business user manager, or a terminal user. The systems and methods may further provide the ability to monitor many terminal users working simultaneously on a plurality of customer applications. An analyst may also simulate a chosen process and automatically tune and/or modify it.

A business user manager may oversee the work of the business users and receive statistical data about their performances. This ability may be done through the dashboard feature of the program as illustrated previously, in FIG. 5.

Figure 17:
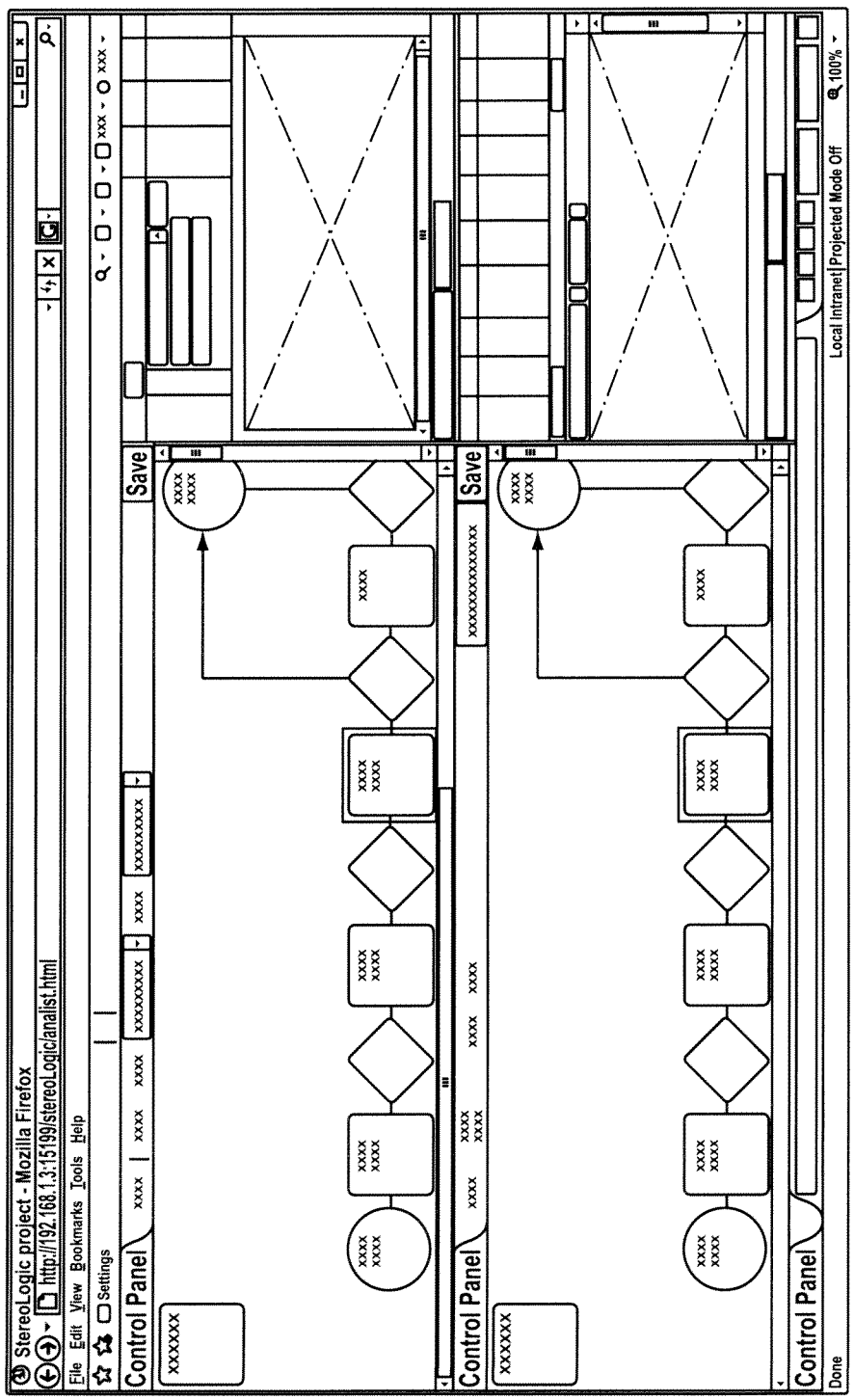
FIG. 17 further illustrates the system according to the FIG. 13 example.

In another aspect, the present methods and systems for business process modeling have the ability for various users to collaborate. A chat ability may be provided where users may correspond with each other and to the systems automatic agent. The combination of the chat feature and the modeling technologies monitor and accumulate information from multiple sources, including people, documents and real systems simultaneously and comprehensively. FIG. 17 illustrates a graphical user interface of the current example when operated with third party applications, including document processing applications.

Figure 18:
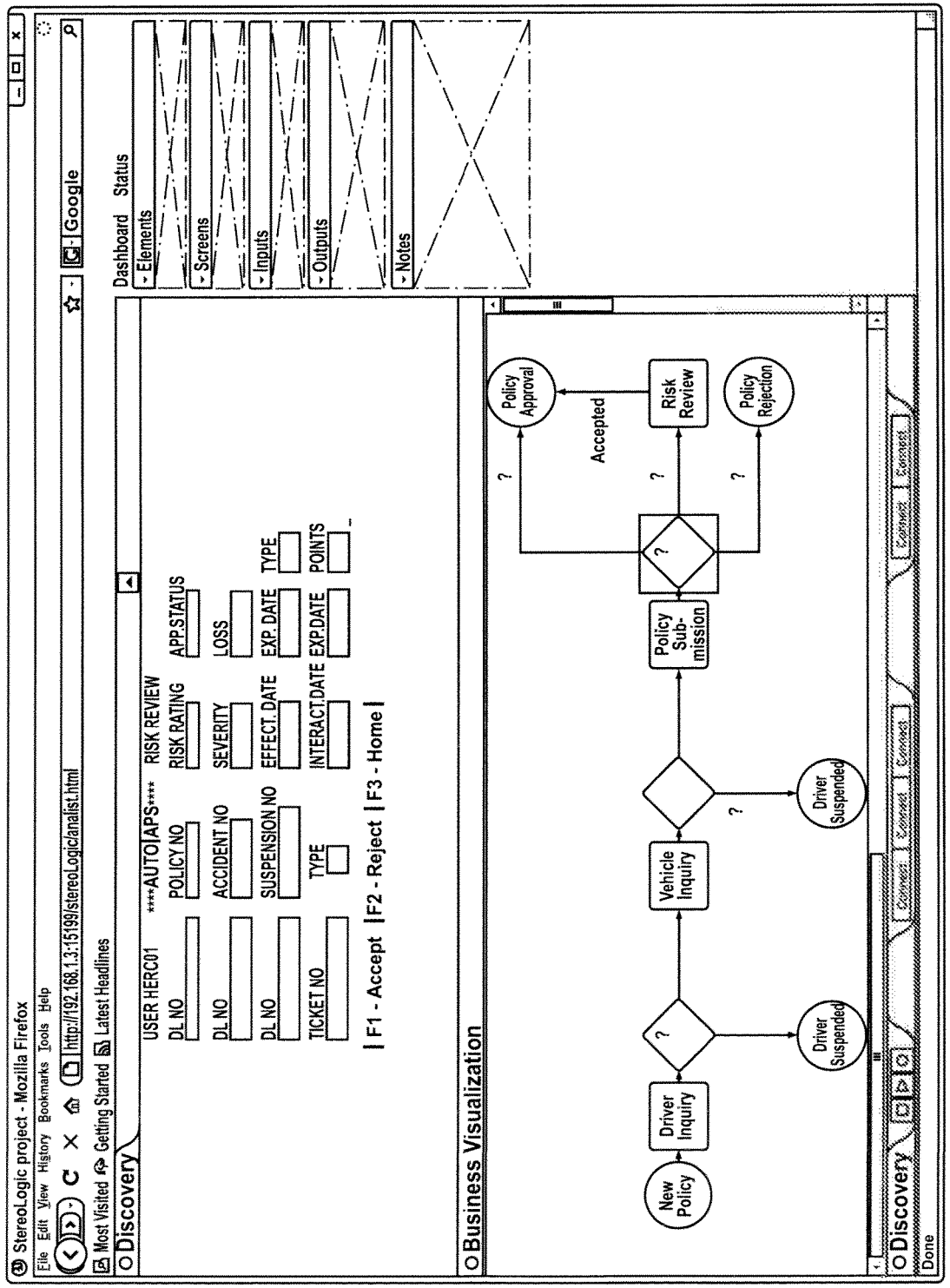
FIG. 18 further illustrates the system according to the FIG. 13 example.

The business process may be modified on the same modeling platform that was used for the discovery as can be seen in FIG. 18. In this example, group of elements may be united into a library as a reusable component.

Figure 19:
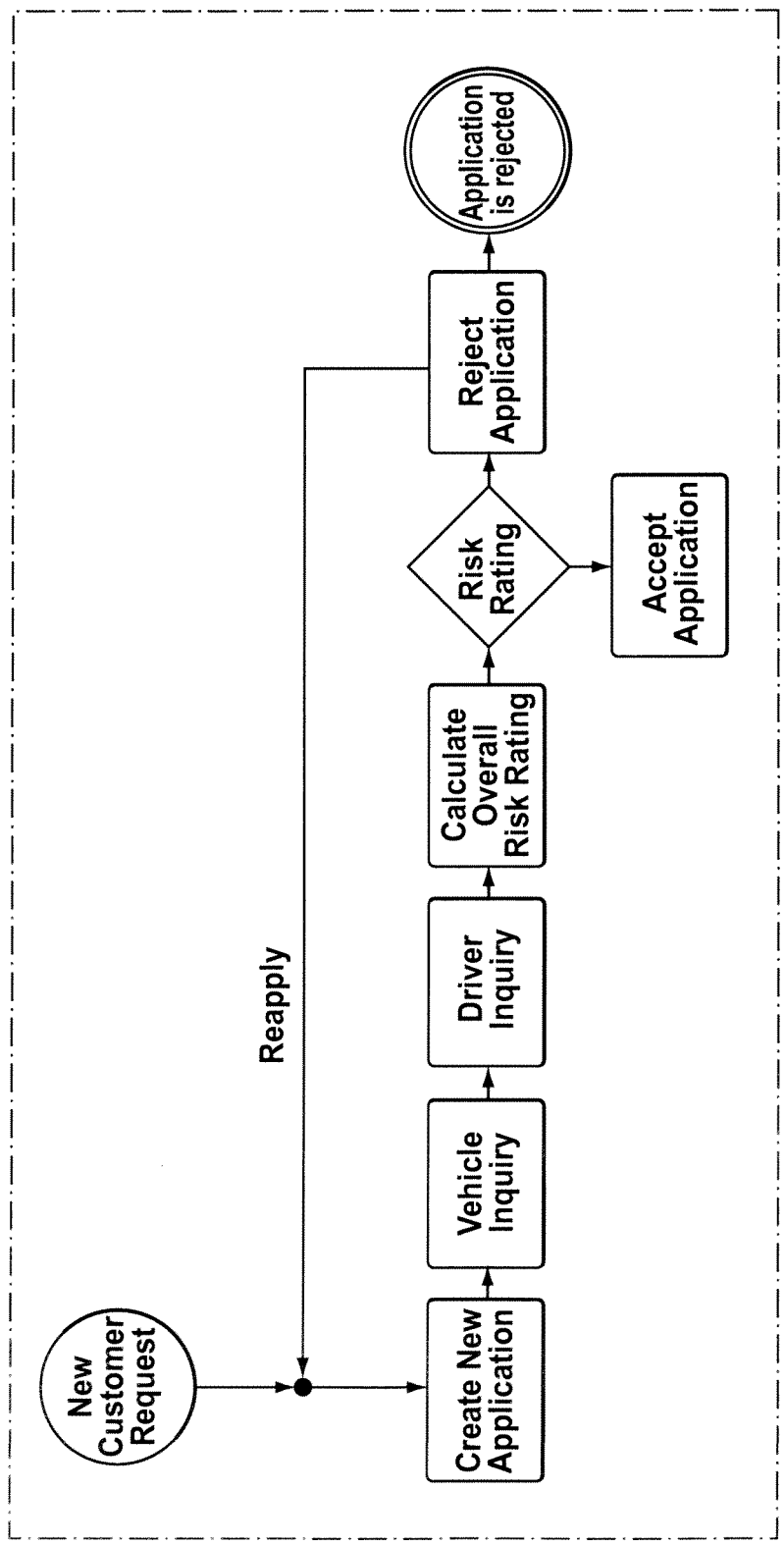
FIG. 19 illustrates an editable business process model according to one embodiment of the present business process modeling methods and systems.

As discussed above, the present methods and systems for business process modeling include a BPMN editor. As shown in FIG. 19, each BPMN element may be represented as a square on a grid. A basic edit operation may comprise of selecting at least one square, choosing an action and receiving and visualizing a result. If the result in not the anticipated result the operation may be reversed. Various BPMN elements and connectors are provided. The BPMN elements may include but are not limited to a start state, an end state, a decision and an activity. Connectors may include a straight 2 point connector, an angled 2 point connector, a hub with 3 or 4 points (and may include splitters and mergers) and a viaduct for intersecting connectors.

If a user wishes to select a single element the user may move a cursor to a specific element on the grid and select that element. Once it is selected, the background of that element may appear highlighted or have another identifying quality to alert the user that it has been selected. Menu options are also provided and may be organized in groups that may be extendible and collapsible. Icons may also represent menu items graphically.

A user may also wish to select a range of elements. Once a range has been selected, the elements will again be identified to the user as selected and a range context menu can be provided.

Another option offered to a user may be to edit an element text. Once an element is selected to be edited, a user may see a display of the editable text area inside the selected element with a cursor. The user may then modify the text accordingly.

Connection ports are also provided so that all elements of the business process model may be properly connected with other elements. Ports may be used to optimize the connection logic and minimize the use of connectors on the diagram. There are generally two types of connectors, namely input and output connectors. In one example, only output connectors may be visible by default. Output ports will auto-connect to the adjacent input ports when a new element is inserted or moved. Once connected, an input port may become visible.

A user may also wish to create or replace a single element. The user may do so by selecting a square on the grid and selecting the desired element to create or replace from the context menu. The system may perform a necessary option of either inserting a row or column to allow for a new element to be added. The system may further connect the adjacent output ports to the new element.

A turn function is also provided that may allow a user to rotate the output ports so that it may take any position that is not occupied by a connected input port. This operation will not allow the turned element to have an output port meet another output port. Once the element is turned, the connections previously held by the output port will break and new connections may be established based on the rotated input and output ports.

The systems for business process modeling may also provide for a draw mode to allow a user to create multiple connected elements by moving the cursor through use of a mouse or other input means. Any element may be selected in draw mode. When activated, draw mode may also allow a user to create disconnected elements by selecting an empty square on the grid. The user may then switch to edit mode, where the system will allow the user to edit the text on the last drawn element. Draw mode allows the user greater flexibility when wishing to edit a business process model.

Figure 20:
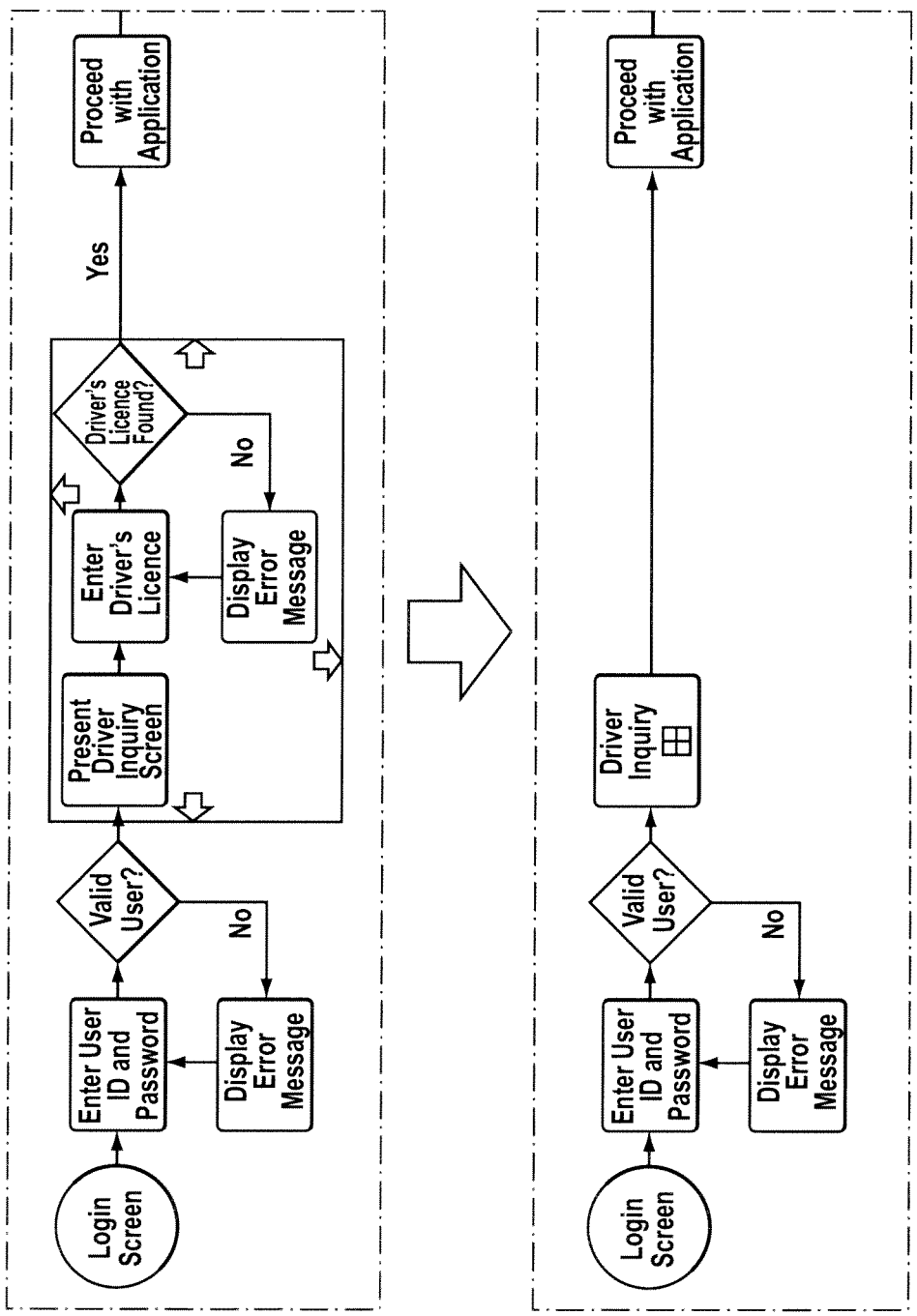
FIG. 20 illustrates creating a library according to one embodiment of the present business process modeling methods and systems.

Another aspect of the editor and BP modeling system is the ability for a user to create a library model from a range of selected elements. The user may then edit the name of the library and the system will then replace the selected range with the library model element as shown in FIG. 20. The system will further reconnect the ports and connectors previously pointing to the range. The system may also provide the ability to insert a library into the business model from the libraries listed in, for example, a context menu.

In the preceding description, for purposes of explanation, numerous details are set forth in order to provide a thorough understanding of the embodiments. However, it will be apparent to one skilled in the art that these specific details may not be required in order to practice the embodiments. In other instances, well-known structures and information its may be shown in block diagram form, or omitted, in order not to obscure the embodiments.

The above-described embodiments are intended to be examples only. Alterations, modifications and variations can be effected to the particular embodiments by those of skill in the art without departing from the scope, which is defined solely by the claims appended hereto.

What is claimed is:

1. A system for modeling business processes, the system comprising:
   one or more modules stored on a memory component and executable by one or more processors, the one of or more modules comprising:
   a discovery module for monitoring a sequence of activities as conducted by a user by monitoring the computer screens used by the user and for recording the computer screens used, the discovery module configured to:
   extract text elements from the computer screens;
   compare computer screens to previously collected computer screens; and
   determine flows based on the text elements and the compared computer screens;
   a modeler module for automatically modeling the business process based on the information received and analyzed by the discovery module, the modeler module comprising:
   an automatic pattern matching module that uses pattern matching to determine key semantic (logical) elements based on the extracted text elements and compared computer screens and to determine a weight for at least one of the key semantic elements, wherein determining the weight comprises:
   determining a nature of the key semantic elements, wherein determining the nature comprises:
   determining whether the key semantic element is protected;
   determining whether the key semantic element is visible; and
   determining a color of the key semantic element;
   reviewing the extracted text elements against a configurable rule set; and
   selecting a text element with a larger weight as a title or activity name;
   an automatic flow analysis system that, based on the computer screens and the weighted key semantic (logical) elements therein, uses logical screen identity and flow identity rules to automatically determine a set of business process flows, wherein the flows are determined by:
   partitioning the computer screens into a set of flows related to the title or activity name;
   partitioning the set of flows into classes of flows based on an identity of end logical activities of each flow;

partitioning each class into sub-classes based on flow identity criteria; and determining business process flows for each sub-class of each class; and a generator module that creates a preliminary business process model based on the set of business process flows; and a transformation module for transforming the business model to a business modeling notation for storage and modification purposes;

an editor module for converting the set of business process flows to user editable business process flows to allow a user to modify the business model;

a processor for executing instructions from the discovery module, the modeler module, the generator module, and the editor module;

a database for storing the business modeling notation; and a dashboard to display a graphical user interface of the business modeling notation in real-time.

2. The system of claim 1, further comprising:

a communications component for communication with the user to confirm information about the computer screens viewed by the user and user interactions.

3. A method of modeling business processes, the method comprising:

monitoring, by one or more processors, a sequence of activities, as conducted by a user by monitoring computer screens used by the user and recording the computer screens used;

extracting, by one or more processors, text elements from the computer screens;

comparing, by one or more processors, computer screens to previously collected computer screens;

determining, by one or more processors, flows based on the text elements and the compared computer screens;

using automatic pattern matching to determine, by one or more processors, key semantic (logical) elements of each computer screen based on the extracted text elements and compared computer screens and to determine a weight for at least one of the key semantic elements wherein determining the weight comprises:

determining, by one or more processors, a nature of the key semantic elements, wherein determining the nature comprises:

determining, by one or more processors, whether the key semantic element is protected;

determining, by one or more processors, whether the key semantic element is visible; and determining, by one or more processors, a color of the key semantic element;

reviewing, by one or more processors, the extracted text elements against a configurable rule set; and selecting, by one or more processors, a text element with a larger weight as a title or activity name;

based on the computer screens and weighted key semantic (logical) elements therein, using logical screen identity and flow identity rules to automatically determine, by one or more processors, a set of business process flow, wherein the flows are determined by:

partitioning, by one or more processors, the computer screens into a set of flows related to the title or activity name;

partitioning, by one or more processors, the set of flows into classes of flows based on an identity of end logical activities of each flow;

partitioning, by one or more processors, each class into sub-classes based on flow identity criteria; and determining, by one or more processors, business process flows for each sub-class of each class;

using intersection points of process flows to define business process fragments from the set of business process flows;

combining, by one or more processors, business process fragments, by the processor, to create a business process model;

converting, by one or more processors, the business process fragments to user editable business process fragments to allow a user to edit the business process model; and displaying, by one or more processors, a graphical user interface of the business modeling notation, via a dashboard, in real-time.

4. The system of claim 1, wherein the modeler module is configured to display statistics associated with users and activities of the set of business process flows.

5. The system of claim 4, wherein the statistics include statistics related to process performance characteristics.

6. The system of claim 1 wherein the automatic pattern matching module is configured to determine patterns for data names and key field parameters.

7. The system of claim 1, wherein the automatic flow analysis system is configured to transform many screen instances to generalized logical activities to produce the set of business process flows.

8. The method of claim 3, wherein the key semantic element is a sentence displayed on the computer screens.

9. A computer aided method of modeling business processes, the method comprising:

recording, by one or more processors, computer screens used by a plurality of users via the one or more processors and memory;

performing, by one or more processors, automatic semantic recognition on the recorded computer screens to determine an activity as conducted by the plurality of users, the semantic recognition performed by a processor and comprising:

performing, by one or more processors, automatic pattern matching to determine key semantic (logical) human-readable text elements of each computer screen, the automatic pattern matching comprising:

extracting, by one or more processors, semantic (logical) human-readable text elements from the computer screens via text recognition by a processor to generate extracted semantic elements;

applying, by one or more processors, a weight to the extracted semantic elements, wherein applying a weight comprises:

determining, by one or more processors, whether the extracted semantic element includes words that are in process specific dictionaries and, if so, increasing the weight;

determining, by one or more processors, whether the extracted semantic element is in a physically prominent location comprising the first three rows or initial columns of the computer screen and, if so, increasing the weight; and determining, by one or more processors, whether the extracted semantic element has a color that is different from other extracted semantic elements and, if so, increasing the weight; and comparing, by one or more processors, the weights of the extracted semantic elements to a threshold;

selecting, by one or more processors, key semantic (logical) human-readable text elements, the key semantic (logical) human-readable text elements representing extracted semantic elements with a larger weight than the threshold as at least one potential activity; and presenting, by one or more processors, the at least one potential activity to an analyst for selection of the activity;

using screen comparison to determine dynamic elements on the extracted screens; and using logical screen identity between computer screens, the key semantic (logical) human-readable text elements, and flow identity rules to match computer screens and flows to automatically, via a processor, determine a set of business process flows, wherein the flows are determined by:

partitioning, by one or more processors, the computer screens into a set of flows related to a sequence of the selected activities;

partitioning, by one or more processors, the set of flows into classes of flows based on an identity of end logical activities of each flow;

partitioning, by one or more processors, each class into sub-classes based on flow identity criteria; and determining, by one or more processors, business process flows for each sub-class of each class; and displaying, by one or more processors, a graphical user interface of the business modeling notation in real-time.

10. The system of claim 1, further comprising an instant messaging protocol to allow the user to communicate with other users of the business processes.

* * * * *